US008422532B2

(12) United States Patent
Nakao et al.

(10) Patent No.: US 8,422,532 B2
(45) Date of Patent: Apr. 16, 2013

(54) RADIO COMMUNICATION DEVICE AND RESPONSE SIGNAL SPREADING METHOD

(75) Inventors: Seigo Nakao, Kanagawa (JP); Hidetoshi Suzuki, Kanagawa (JP); Daichi Imamura, Kanagawa (JP); Katsuhiko Hiramatsu, Leuven (BE)

(73) Assignee: Panasonic Corporation, Osaka (JP)

( * ) Notice: Subject to any disclaimer, the term of this patent is extended or adjusted under 35 U.S.C. 154(b) by 502 days.

(21) Appl. No.: 12/679,440

(22) PCT Filed: Sep. 24, 2008

(86) PCT No.: PCT/JP2008/002639
§ 371 (c)(1),
(2), (4) Date: Mar. 22, 2010

(87) PCT Pub. No.: WO2009/041029
PCT Pub. Date: Apr. 2, 2009

(65) Prior Publication Data
US 2010/0232473 A1    Sep. 16, 2010

(30) Foreign Application Priority Data

Sep. 25, 2007   (JP) ................................. 2007-247848
Jun. 3, 2008    (JP) ................................. 2008-145543

(51) Int. Cl.
*H04B 1/69* (2011.01)
(52) U.S. Cl.
USPC ........... 375/130; 375/329; 375/376; 375/141; 375/147; 370/315; 370/329; 455/452.1
(58) Field of Classification Search ................. 375/130, 375/308, 329, 376, 141, 147; 370/329, 315; 455/452.1
See application file for complete search history.

(56) References Cited

U.S. PATENT DOCUMENTS

| 6,940,892 B2 * | 9/2005 | Okubo et al. ................. 375/130 |
| 2003/0031230 A1 * | 2/2003 | Kwon et al. ................. 375/130 |
| 2003/0067962 A1 * | 4/2003 | Yellin ........................... 375/130 |

(Continued)

FOREIGN PATENT DOCUMENTS

| JP | 2004-088269 | 3/2004 |
| WO | 2004/084505 | 9/2004 |

OTHER PUBLICATIONS

International Search Report dated Dec. 16, 2008.

(Continued)

*Primary Examiner* — Eva Puente
(74) *Attorney, Agent, or Firm* — Dickinson Wright PLLC

(57) ABSTRACT

A radio communication device in which the waste of physical resources involved in the repetition transmission of a response signal can be minimized with no restriction on the scheduling of a base station imposed or with the restriction on the scheduling thereof minimized. In this device, a control unit (209) selects the ZAC sequence of the cyclic shift amount corresponding to a PUCCH number inputted from a determination section (208) from among ZAC#0 to ZAC#11 to set it to a spreading section (215) and selects the block-wise spreading code sequence corresponding to the PUCCH number inputted from the determination section (208) from BW#0 to BW#2 to set it to a spreading section (218). More specifically, the control unit (209) selects any of the resources defined by the ZAC#0 to ZAC#11 and the BW#0 to BW#2. As a result, the more the number of transmissions of the response signal, the less the number of resources the control unit (209) can select.

11 Claims, 19 Drawing Sheets

U.S. PATENT DOCUMENTS

| | | | |
|---|---|---|---|
| 2004/0032838 A1* | 2/2004 | Min | 370/315 |
| 2005/0163082 A1 | 7/2005 | Sudo | |
| 2006/0007884 A1 | 1/2006 | Tanaka | |
| 2009/0209264 A1* | 8/2009 | Yang et al. | 455/452.1 |
| 2011/0142094 A1* | 6/2011 | Pan et al. | 375/130 |

OTHER PUBLICATIONS

3GPP TSG RAN WG1 Meeting #47bis, R1-070101, NTT DoCoMo, KDDI, Mitsubishi Electric, NEC, Panasonic, Sharp, "Repetition of ACK/NACK in E-UTRA Uplink," Jan. 19, 2007, pp. 1-6.

3GPP TSG RAN WG1 Meeting #50, R1-073620, Panasonic, "Clarification of Implicit Resource Allocation of Uplink ACK/NACK Signal," Aug. 24, 2007, pp. 1-2.

3GPP TSG RAN WG1 Meeting #50, R1-073462, NEC Group, "PUCCH allocation for ACK/NACK transmission," Aug. 24, 2007, pp. 1-4.

3GPP TSG RAN WG1 Meeting #50bis, R1-074408, "Ack/Nack repetition and Implicit Resource Allocation for PUCCH," Oct. 12, 2007, pp. 1-2.

3GPP TSG RAN WG1 Meeting #49, R1-072439, NTT DoCoMo, Fujitsu, Mitsubishi Electric, "Implicit Resource Allocation of ACK/NACK Signal in E-UTRA Uplink," May 11, 2007, pp. 1-3, p. 6, line 14.

3GPP TSG RAN WG1 Meeting #49, R1-072315, Nokia Siemens Networks, Nokia, "Multiplexing capability of CQIs and ACK/NACKs form different UEs," May 11, 2007, pp. 1-4, p. 6, line 18.

3GPP TSG RAN1 #50, R1-073261, Qualcomm Europe, "Support of ACK Repetition for E-UTRA Uplink," Aug. 24, 2007, pp. 1-2, p. 6, line 22.

Notice of Reasons for Rejection dated Jul. 31, 2012.

3GPP TSG RAN1#50, "E-UTRA Uplink Reference Signal Planning and Hopping Considerations," Motorola, R1-073755, Aug. 20-24, 2007, pp. 1-11.

3 GPP TSG RAN WG1 Meeting #50, "Variable Phase Definition of the Reference Signal for CQI in PUCCH," Panasonic, R1-073621, Aug. 20-24, 2007, pp. 1-5.

3 GPP TSG-RAN-WG1 Meeting #50, "Multiplexing of Scheduling Request Indicator," Huawei, ZTE, R1-073521, Aug. 20-24, 2007, 4 pages total.

\* cited by examiner

RADIO COMMUNICATION DEVICE AND RESPONSE SIGNAL SPREADING METHOD

TECHNICAL FIELD

The present invention relates to a radio communication apparatus and a response signal spreading method.

BACKGROUND ART

In mobile communications, automatic repeat request ("ARQ") is applied to downlink data from a radio communication base station apparatus (hereinafter "base station") to a radio communication mobile station apparatus (hereinafter "mobile station"). That is, the mobile station feeds back a response signal showing an error detection result of downlink data to the base station. The mobile stations performs CRC (Cyclic Redundancy Check) check for uplink data, and, if CRC=OK (no error), feeds back an ACK (ACKnowledgment), and, if CRC=NG (error present), feeds back a NACK (Negative ACKnowledgment), as a response signal to the mobile station. This response signal is transmitted to the base station using an uplink control channel, for example, a PUCCH (Physical Uplink Control Channel).

Further, the base station transmits control information for reporting a resource allocation result of downlink data to the mobile station. This control information is transmitted to the mobile station using downlink control channels including L1/L2 CCHs (L1/L2 Control Channels). Each L1/L2 CCH occupies one or a plurality of CCEs (Control Channel Elements) according to the coding rate for control information. If the L1/L2 CCH for reporting control information of a coding rate 2/3 occupies one CCE, the L1/L2 CCH for reporting control information of a coding rate 1/3 occupies two CCEs, the L1/L2 CCH for reporting control information of a coding rate 1/6 occupies four CCEs, and the L1/L2 CCH for reporting control information of a coding rate 1/12 occupies eight CCEs. Further, when one L1/L2 CCH occupies a plurality of CCEs, one L1/L2 CCH occupies a plurality of consecutive CCEs. The base station generates a mobile station-specific L1/L2 CCH, allocates CCEs that should be occupied by the L1/L2 CCH according to the number of CCEs required for control information, and maps the control information to physical resources corresponding to the allocated CCEs, to transmit the control information.

Further, to eliminate the need for signaling for reporting PUCCHs, which are used to transmit response signals, from the base station to mobile stations and to use downlink resources efficiently, studies are underway to associate CCEs with PUCCHs one by one (see Non-Patent Document 1). According to this association, each mobile station is able to identify the PUCCH to use to transmit a response signal from the mobile station, from CCEs corresponding to physical resources to which control information for the mobile station is mapped. Consequently, each mobile station maps a response signal from the mobile station, to the physical resource based on the CCE corresponding to the physical resource to which control information for the mobile station is mapped. If a CCE corresponding to a physical resource to which control information directed to a mobile station is mapped to is CCE #0, the mobile station decides PUCCH #0 associated with CCE #0 to be the PUCCH for the mobile station. Further, if the CCEs corresponding to physical resources to which control information directed to a mobile station is mapped, are CCE #0 to CCE#3, the mobile station decides PUCCH #0 associated with CCE #0, which is the smallest number among CCE #0 to CCE #3, to be the PUCCH for the mobile station. If the CCEs corresponding to physical resources to which control information directed to a mobile station is mapped, are CCE #4 to CCE #7, the mobile station decides PUCCH #4 associated with CCE #4, which is the smallest number among CCE #4 to CCE #7, to be the PUCCH for the mobile station.

Further, as shown in FIG. 1, studies are underway to perform code-multiplexing by spreading a plurality of response signals from a plurality of mobile stations using ZAC sequences and Walsh sequences (see Non-Patent Document 2). In FIG. 1, [$W_0, W_1, W_2, W_3$] represent a Walsh sequence of a sequence length of 4. As shown in FIG. 1, in a mobile station, a response signal of ACK or NACK is subject to first spreading to one symbol in the time domain by a ZAC sequence (with a sequence length of 12) in the frequency domain. Next, the mobile station associates the response signal after the first spreading with $W_0$ to $W_3$ and performs an IFFT (Inverse Fast Fourier Transform). By this IFFT, the response signal spread in the frequency domain is converted to a ZAC sequence of a sequence length of 12 in the time domain. Then, the signal after the IFFT is secondly spread using Walsh sequences (with a sequence length of 4). That is, one response signal is assigned to each of four symbols $S_0$ to $S_3$. Likewise, other mobile stations spread response signals using a ZAC sequence and a Walsh sequence. Different mobile stations use ZAC sequences of different amount of cyclic shift in the time domain or use different Walsh sequences. Here, the sequence length of a ZAC sequence in the time domain is 12, so that it is possible to use twelve ZAC sequences of amounts of cyclic shift "0" to "11" generated from the same ZAC sequence. Also, the sequence length of a Walsh sequence is 4, so that it is possible to use four varying Walsh sequences. Consequently, in an ideal communication environment, it is possible to code-multiplex response signals from maximum forty-eight (12×4) mobile stations.

Further, as shown in FIG. 1, studies are underway to code-multiplex a plurality of reference signals (pilot signals) from a plurality of mobile stations (see Non-Patent Document 2). As shown in FIG. 1, when three symbols of a reference signal $R_0$, $R_1$ and $R_2$ are generated from a ZAC sequence (with a sequence length of 12), the ZAC sequence is subject to an IFFT (Inverse Fast Fourier Transform) in association with an orthogonal sequence, for example, a Fourier sequence [$F_0, F_1, F_2$] of a sequence length of 3. This IFFT makes it possible to acquire a ZAC sequence of a sequence length 12 in the time domain. Then, the signal after the IFFT is spread using the orthogonal sequence [$F_0, F_2$]. That is, one reference signal (a ZAC sequence) is allocated to three symbols $R_0$, $R_1$ and $R_2$. Likewise, one reference signal (a ZAC sequence) is allocated to three symbols $R_0$, $R_1$ and $R_2$ in other mobile stations. Different mobile stations use ZAC sequences of different amount of cyclic shift in the time domain or use different orthogonal sequences. Here, the sequence length of a ZAC sequence in the time domain is twelve, so that it is possible to use twelve ZAC sequences of amounts of cyclic shift "0" to "11" generated from the same ZAC sequence. Further, the sequence length of an orthogonal sequence is three, so that it is possible to use three varying orthogonal sequences. Consequently, in an ideal communication environment, it is possible to code-multiplex the maximum thirty-six (12×3) reference signals from the mobile stations.

Then, as shown in FIG. 1, one slot is composed of seven symbols, $S_0$, $S_1$, $R_0$, $R_1$, $R_2$, $S_2$ and $S_3$.

Here, the cross-correlation between ZAC sequences between varying amounts of cyclic shift generated from a single ZAC sequence, is approximately zero. Consequently, in an ideal communication environment, correlation processing in the base station makes it possible to separate a plurality of response signals spread by ZAC sequences of varying amounts of cyclic shift (the amounts of cyclic shift 0 to 11) and code-multiplexed, almost without inter-code interference in the time domain.

However, a plurality of response signals from a plurality of mobile stations do not all arrive at the base station at the same time due to the difference of transmission timings between mobile stations, influence of multipath delayed waves and so on. For example, when the transmission timing of a response signal spread by the ZAC sequence of the amount of cyclic shift "0" is delayed from the correct transmission timing, the correlation peak of the ZAC sequence of the amount of cyclic shift "0" may appear in the detection window for the ZAC sequence of the amount of cyclic shift "1." Further, when there is a delayed wave in a response signal spread by a ZAC sequence of the amount of cyclic shift "0," an interference leakage due to that delayed wave may appear in the detection window for the ZAC sequence of the amount of cyclic shift "1." Accordingly, in these cases, the ZAC sequence of the amount of cyclic shift "1" is interfered with the ZAC sequence of the amount of cyclic shift "0." Consequently, in these cases, the separation performance degrades between a response signal spread by the ZAC sequence of the amount of cyclic shift "0" and a response signal spread by the ZAC sequence of the amount of cyclic shift "1." Therefore, if ZAC sequences of adjacent amounts of cyclic shift are used, the separation performance of response signals may degrade.

Therefore, conventionally, if a plurality of response signals are code-multiplexed by spreading of ZAC sequences, a cyclic shift interval (i.e. the difference between the amounts of cyclic shift) is provided between ZAC sequences, to an extent that does not cause inter-code interference between ZAC sequences. For example, when the cyclic shift interval between ZAC sequences is 2, only six ZAC sequences of amounts of cyclic shift "0," "2," "4," "6," "8" and "10" are used for the first spreading of a response signal among twelve ZAC sequences of cyclic shift values "0" to "11." Therefore, if a Walsh sequence of a sequence length of 4 is used for second spreading of a response signal, it is possible to code-multiplex response signals from maximum twenty-four (6×4) mobile stations.

However, as shown in FIG. 1, the sequence length of an orthogonal sequence to use to spread a reference signal is 3, and therefore only three varying orthogonal sequences can be used to spread a reference signal. Accordingly, when a plurality of response signals are separated using the reference signals shown in FIG. 1, it is possible to code-multiplex only response signals from maximum eighteen (6×3) mobile stations. Consequently, three Walsh sequences among four Walsh sequences of the sequence length of 4 are enough, and any one of Walsh sequences is not used.

Here, as described above, when a L1/L2 CCH occupies a plurality of CCEs, a mobile station transmits a response signal using the PUCCH associated with the smallest CCE number among a plurality of CCEs, and therefore PUCCHs associated with CCEs other than the CCE of the smallest number are not used and become useless. If an L1/L2 CCH occupies eight CCEs, CCE #0 to CCE #7, PUCCH #0 alone associated with the smallest CCE number #0 is used to transmit a response signal and PUCCHs #1 to #7 are not used, and therefore physical resources for PUCCHs #1 to #7 become useless. Also, to improve a rate of arrival of a response signal to the base station, when a mobile station transmits an identical response signal over a plurality of subframes a plurality of times in repetition, that is, when a mobile station repeats transmitting a response signal, a waste of physical resources for response signals increases depending on the number of times the response signals are transmitted.

To reduce a waste of physical resources involved in repeating transmitting a response signal, a technique of defining in advance subframes allowing repetition transmissions and subframes not allowing repetition transmissions, and preparing physical resources for repeating a response signal only to downlink data transmitted in specific subframes (see Non-Patent Document 3).

Non-Patent Document 1: Implicit Resource Allocation of ACK/NACK Signal in E-UTRA Uplink (ftp://ftp.3gpp.org/TSG_RAN/WG1_RL1/TSGR1_49/Docs/R1-0724 39.zip)

Non-Patent Document 2: Multiplexing capability of CQIs and ACK/NACKs form different UEs (ftp://ftp.3gpp.org/TSG_RAN/WG1_RL1/TSGR1_49/Docs/R1-0723 15.zip)

Non-Patent Document 3: Support of ACK Repetition for E-UTRA Uplink (ftp://ftp.3gpp.org/TSG_RAN/WG1_RL1/TSGR1_50/Docs/R1-0732 61.zip)

DISCLOSURE OF INVENTION

Problems to be Solved by the Invention

However, with the above conventional technique, the base station is able to allocate to only specific subframes downlink data for a mobile station that repeats transmitting a response signal and therefore downlink data scheduling is largely restricted and is made complicated.

It is therefore an object of the present invention to provide a radio communication apparatus and a response signal spreading method that minimize a waste of physical resources involved in repeating transmitting a response signal without restricting scheduling in the base station or while minimizing restrictions on scheduling in the base station.

Means for Solving the Problem

The radio communication apparatus of the present invention adopts a configuration including: a selection section that selects one of resources among a plurality of resources defined by a plurality of first sequences that are separable from each other using varying amounts of cyclic shift and a plurality of second sequences orthogonal to each other; a first spreading section that performs first spreading of a response signal using a first sequence of an amount of cyclic shift associated with the resource selected in the selection section; and a second spreading section that performs second spreading of the response signal after the first spreading using a second sequence associated with the resource selected in the selection section, wherein the number of resources allowed to be selected in the selection section decreases when the number of times the response signal is transmitted increases.

The response signal spreading method according to the present invention includes steps of: a selection step of selecting one of resources among a plurality of resources defined by a plurality of first sequences that are separable from each other using varying amounts of cyclic shift and a plurality of second sequences orthogonal to each other; a first spreading step of performing first spreading of a response signal using a first sequence of an amount of cyclic shift associated with the resource selected in the selection step; and a second spreading step of performing second spreading of the response signal after the first spreading using a second sequence associated with the resource selected in the selection step, wherein the number of resources allowed to be selected in the selection step decreases when the number of times the response signal is transmitted increases.

Advantageous Effects of Invention

According to the present invention, it is possible to minimize a waste of physical resources involved in repeating transmitting a response signal without restricting scheduling in a base station or while minimizing the restrictions on scheduling in a base station.

BEST MODE FOR CARRYING OUT THE INVENTION

Now, embodiments of the present invention will be described in detail with reference to the accompanying drawings.

Embodiment 1

Figure 2:
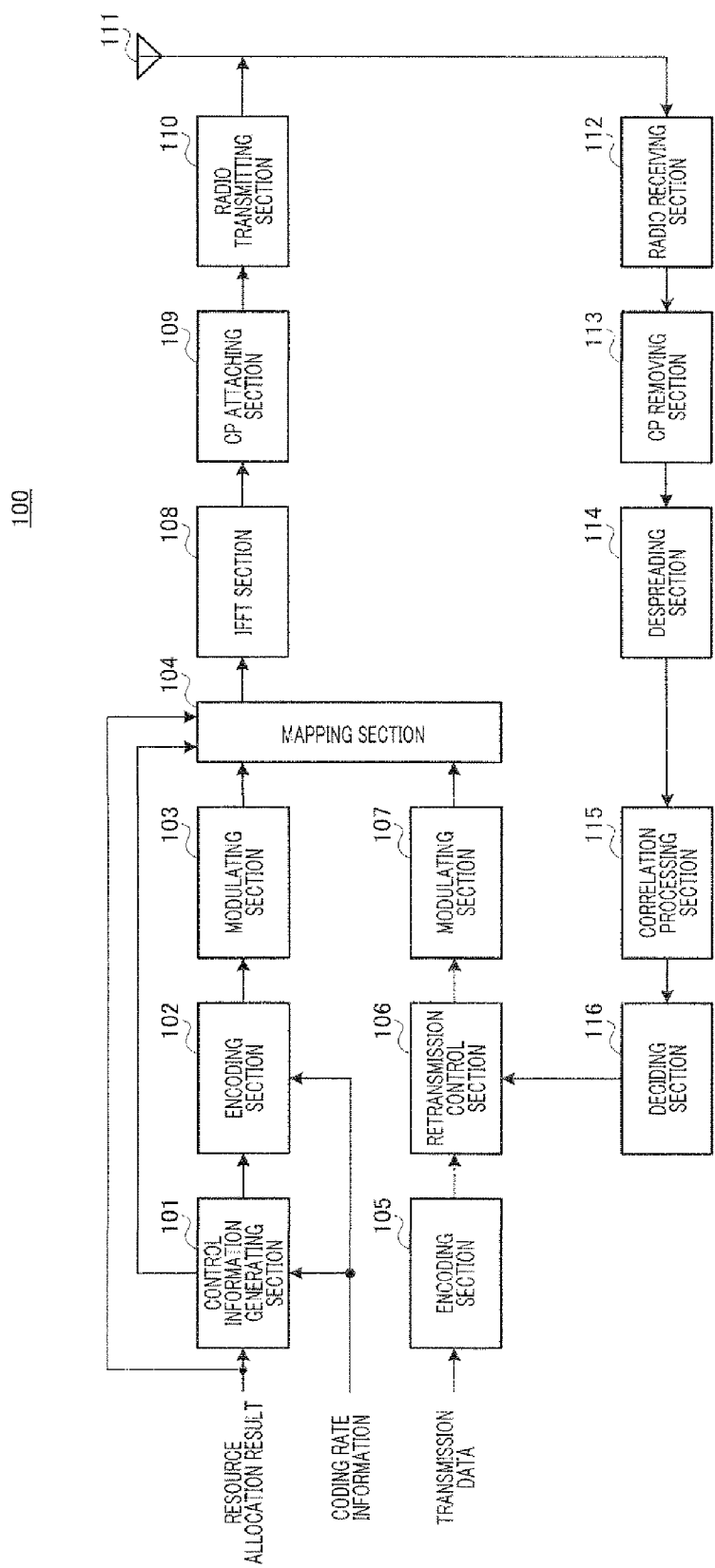
FIG. 2 is a block diagram showing the configuration of a base station according to Embodiment 1 of the present invention.
Figure 3:
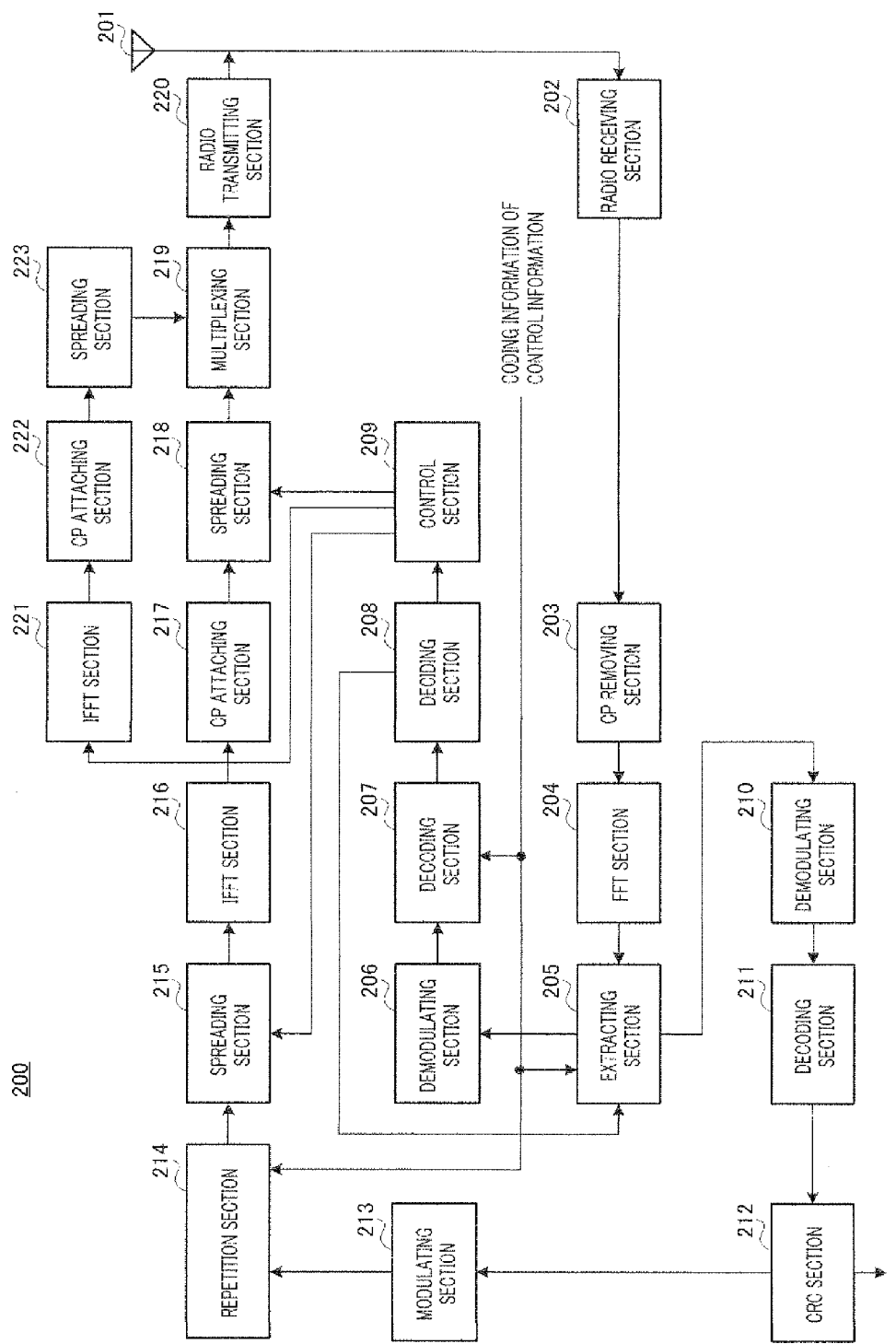
FIG. 3 is a block diagram showing the configuration of a mobile station according to Embodiment 1 of the present invention.

FIG. 2 shows the configuration of base station 100 according to the present embodiment, and FIG. 3 shows the configuration of mobile station 200 according to the present embodiment.

To avoid complicated explanation, FIG. 2 shows components associated with transmission of downlink data and components associated with reception of uplink response signals to the downlink data, which are closely related to the present invention, and drawings and explanations of the components associated with reception of uplink data will be omitted. Likewise, FIG. 3 shows components associated with reception of downlink data and components associated with transmission of uplink response signals to the downlink data, which are closely related to the present invention, and illustration and explanation of the components associated with transmission of uplink data will be omitted.

Figure 1:
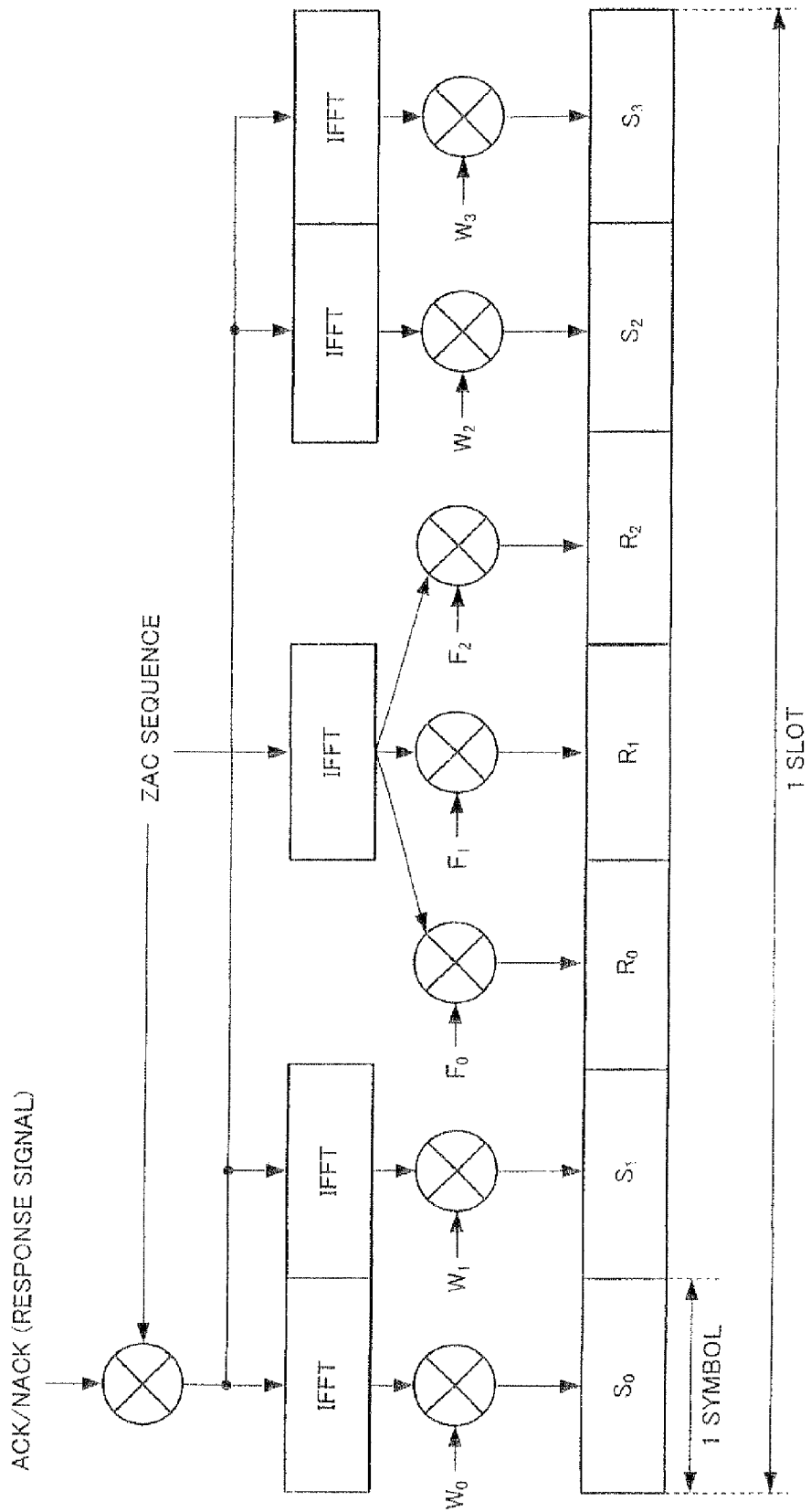
FIG. 1 shows a spreading method of a response signal and a reference signal.

Further, one symbol shown in FIG. 1 may be referred to as "1 LB (Long Block)." Then, with the following explanation, a spreading code sequence used for spreading in symbol units, that is, a spreading code sequence used for spreading in LB units, is called a "block-wise spreading code sequence."

Also, with the following explanation, a case will be described where ZAC sequences are used for the first spreading and block-wise spreading code sequences are used for second spreading. However, in the first spreading, sequences that are other than ZAC sequences and that can be separated from each other by varying amounts of cyclic shift may be used. For example, GCL (Generalized Chirp-Like) sequences, CAZAC (Constant Amplitude Zero Auto Correlation) sequences, ZC (Zadoff-Chu) sequences, or PN sequences such as M sequences and orthogonal Gold code sequences may be used in the first spreading. Further, in second spreading, any sequences may be used as block-wise spreading code sequences as long as the sequences are orthogonal to each other or the sequences are regarded as approximately orthogonal each other. For example, Walsh sequences or Fourier sequences can be used for second spreading as block-wise spreading code sequences.

Further, with the following explanation, twelve ZAC sequences of a sequence length "12" and amounts of cyclic shift "0" to "11" will be referred to as "ZAC #0" to "ZAC #11," and three block-wise code sequences of sequence length "4" and sequence numbers "0" to "2" will be referred to as "BW #0" to "BW #2." However, the present invention is not limited to these sequence lengths.

Further, with the following explanation, PUCCH numbers are defined based on the amount of cyclic shift of ZAC sequences and sequence numbers of block-wise code sequences. Accordingly, a plurality of resources for response signals are defined based on ZAC #0 to ZAC #11 that can be separated from each other by varying amounts of cyclic shift and BW #0 to BW #2 that are orthogonal each other.

Further, with the following explanation, CCE numbers and PUCCH numbers are associated on a one to one basis. That is, CCE #0 and PUCCH #0, CCE #1 and PUCCH #1, CCE #2 and PUCCH #2, and so on, are associated.

In base station 100 shown in FIG. 2, control information generating section 101 and mapping section 104 receive as input a downlink data resource allocation result. Also, control information generating section 101 and encoding section 102 receive as input mobile station-specific coding rates of control information for reporting the downlink data resource allocation result as coding rate information. Here, as described above, coding rate for control information is either 2/3, 1/3, 1/6 or 1/12.

Control information generating section 101 generates control information for reporting the downlink data resource allocation result, on a per mobile station basis, and outputs the generated control information to encoding section 102. Control information per mobile station includes mobile station ID information to designate to which mobile station the control information is directed. For example, control information includes, as mobile station ID information, CRC bits masked by the ID numbers of mobile stations, to which control information is reported. Also, according to the coding rate information received as input, control information generating section 101 allocates L1/L2 CCHs to mobile stations according to the number of CCEs (the number of occupied CCEs) required for reporting control information, and outputs the CCE numbers corresponding to the allocated L1/L2 CCHs to mapping section 104. Here, as described above, an L1/L2 CCH of when a coding rate for control information is 2/3 occupies one CCE. Accordingly, the L1/L2 CCH of when the coding rate for control information is 1/3 occupies two CCEs, the L1/L2 CCH of when the coding rate for control information is 1/6 occupies four CCEs, and the L1/L2 CCH of when the coding rate for control information is 1/12 occupies eight CCEs. Further, as described above, when one L1/L2 CCH occupies a plurality of CCEs, one L1/L2 CCH occupies a plurality of consecutive CCEs.

Encoding section 102 encodes mobile station-specific control information according to coding rate information received as input, and outputs the encoded control information to modulating section 103.

Modulating section 103 modulates the encoded control information, and outputs the modulated control information to mapping section 104.

Meanwhile, encoding section 105 encodes transmission data for the mobile stations (downlink data), and outputs the encoded transmission data to retransmission control section 106.

Upon initial transmission, retransmission control section 106 holds encoded transmission data on a per mobile station basis, and outputs the data to modulating section 107. Retransmission control section 106 holds the transmission data until retransmission control section 106 receives as input an ACK from each mobile station from deciding section 116. Further, upon receiving as input a HACK from each mobile station from deciding section 116, that is, upon retransmission, retransmission control section 106 outputs transmission data in response to that NACK to modulating section 107.

Modulating section 107 modulates the encoded transmission data received as input from retransmission control section 106, and outputs the modulated transmission data to mapping section 104.

Upon transmission of control information, mapping section 104 maps the control information received as input from modulating section 103 to physical resources based on the CCE numbers received as input from control information generating section 101, and outputs the mapped control information to IFFT section 108. That is, mapping section 104 maps the mobile station-specific control information to the subcarrier corresponding to the CCE numbers in a plurality of subcarriers forming an OFDM symbol.

Meanwhile, upon transmission of downlink data, mapping section 104 maps the transmission data for the mobile stations to physical resources based on the resource allocation result, and outputs the mapped transmission data to IFFT section 108. That is, based on the resource allocation result, mapping section 104 maps mobile station-specific transmission data to a subcarrier in a plurality of subcarriers forming an OFDM symbol.

IFFT section 108 generates an OFDM symbol by performing an IFFT for a plurality of subcarriers to which control information or transmission data is mapped, and outputs the generated OFDM symbol to CP (Cyclic Prefix) attaching section 109.

CP attaching section 109 attaches the same signal as the signal at the tail end part of the OFDM symbol, to the head of that OFDM symbol as a CP.

Radio transmitting section 110 performs transmission processing such as D/A conversion, amplification and up-conversion on the OFDM symbol with a CP, and transmits the OFDM symbol after transmission processing from antenna 111 to mobile station 200 (in FIG. 3).

Meanwhile, radio receiving section 112 receives a response signal or a reference signal transmitted from mobile station 200, via antenna 111, and performs receiving processing such as down-conversion and A/D conversion on the response signal or the reference signal.

CP removing section 113 removes the CP attached to the response signal or the reference signal after receiving processing.

Despreading section 114 despreads the response signal by block-wise spreading code sequences that are used for second spreading in mobile station 200, and outputs the despread response signal to correlation processing section 115. Likewise, despreading section 114 despreads the reference signal by an orthogonal sequence that is used for spreading the reference signal in mobile station 200, and outputs the despread reference signal to correlation processing section 115.

Correlation processing section 115 finds the correlation value between the response signal after dispreading and the ZAC sequence that is used for the first spreading in mobile station 200, and outputs the correlation value to deciding section 116.

By detecting correlation peaks on a per mobile station basis, deciding section 116 detects mobile station-specific response signals. For example, when a correlation peak is detected in detection window #0 for mobile station #0, deciding section 116 detects the response signal from mobile station #0. Then, deciding section 116 performs synchronous detection, to decide whether the detected response signal is an ACK or a NACK using the correlation value of the reference signal, and outputs an ACK or a NACK per mobile station to retransmission control section 106.

Meanwhile, in mobile station 200 shown in FIG. 3, radio receiving section 202 receives an OFDM symbol transmitted from base station 100, via antenna 201, and performs receiving processing such as down-conversion and A/D conversion on the OFDM symbol.

CP removing section 203 removes the CP attached to the OFDM symbol after receiving processing.

FFT (Fast Fourier Transform) section 204 performing an FFT of the OFDM symbol, to acquire control information mapped to a plurality of subcarriers or downlink data and outputs them to extracting section 205.

Extracting section 205, decoding section 207 and repetition section 214 receive coding rate information showing a coding rate the control information as input, that is, information showing the number of CCEs occupied by L1/L2 CCHs.

Upon receiving the control information, extracting section 205 extracts the control information from a plurality of subcarriers according to coding information received as input, and outputs the extracted control information to demodulating section 206.

Demodulating section 206 demodulates the control information and outputs the demodulated control information to decoding section 207.

Decoding section 207 decodes the control information according to the coding information received as input, and outputs the decoded control information to deciding section 208.

Meanwhile, upon receiving downlink data, extracting section 205 extracts downlink data directed to the mobile station from the plurality of subcarriers according to the resource allocation result received as input from deciding section 208, and outputs the extracted downlink data to demodulating section 210. This downlink data is demodulated in demodulating section 210, decoded in decoding section 211 and inputted to CRC section 212.

CRC section 212 performs error detection of the decoded downlink data using a CRC, generates an ACK if CRC=OK (no error) and a NACK if CRC=NG (error present), as a response signal, and outputs the generated response signal to modulating section 213. Further, if CRC=OK (no error), CRC section 212 outputs the decoded downlink data as received data.

Deciding section 208 performs blind detection of whether or not the control information received as input from decoding section 207 is directed to the subject mobile station. For example, deciding section 208 decides that, if CRC=OK (no error) as a result of demasking the CRC bits by the ID number of the mobile station, the control information is directed to the subject mobile station. Further, deciding section 208 outputs the control information directed to the mobile station, that is, the downlink data resource allocation result for the mobile station, to extracting section 205.

Further, deciding section 208 decides the PUCCH to use to transmit the response signal from the subject mobile station, from the CCE numbers associated with the subcarriers to which the control information directed to the subject mobile station is mapped, and outputs the decision result (i.e. the PUCCH number) to control section 209. As described above, if the CCE associated with the subcarrier to which the control information directed to the subject mobile station is mapped, is CCE #0, deciding section 208 decides that PUCCH #0 associated with CCE #0 is the PUCCH for the mobile station. Further, if the CCEs associated with the subcarrier to which the control information directed to the subject mobile station is mapped, are CCE #0 to CCE #3, deciding section 208 decides that PUCCH #0 associated with CCE #0, which is the smallest number among CCE #0 to CCE #3, is the PUCCH for the subject mobile station. If the CCEs associated with the subcarrier to which the control information directed to the subject mobile station is mapped, are CCE #4 to CCE #7, deciding section 208 decides that PUCCH #4 associated with CCE #4, which is the smallest number among CCE #4 to CCE #7, is the PUCCH for the subject mobile station.

Based on the PUCCH number received as input from deciding section 208, control section 209 controls the amount of cyclic shift in the ZAC sequence that is used for first spreading in spreading section 215 and the block-wise spreading code sequence that is used for second spreading in spreading section 218. That is, control section 209 selects a ZAC sequence of the amount of cyclic shift corresponding to the PUCCH number received as input from deciding section 208 among ZAC #0 to ZAC #11, and sets up the selected ZAC sequence in spreading section 215, and selects a Walsh sequence corresponding to the PUCCH number received as input from deciding section 208 among BW #0 to BW #2, in spreading section 218. That is, control section 209 selects any one of resources among a plurality of resources defined in ZAC #0 to ZAC #11 and BW #0 to BW #2. The sequence control in control section 209 will be described later in detail. Further, control section 209 outputs the ZAC sequence as a reference signal to IFFT section 221.

Modulating section 213 modulates the response signal received as input from CRC section 212 and outputs the modulated response signal to repetition section 214.

Repetition section 214 decides whether or not to repeat the response signal according to coding rate information received as input.

When the coding rate for control information is 2/3 (i.e. when an L1/L2 CCH occupies one CCE) or 1/3 (i.e. when an L1/L2 CCH occupies two CCEs), repetition section 214 outputs one response signal to spreading section 215 (i.e. repetition factor=1) without repetition. Therefore, in these cases, mobile station 200 transmits a response signal only once.

On the other hand, when the coding rate for control information is 1/6 (i.e. when an L1/L2 CCH occupies four CCEs), repetition section 214 repeats the response signal once and outputs two identical response signals to spreading section 215 over two consecutive subframes (i.e. repetition factor=2). Therefore, in this case, mobile station 200 transmits the same response signal twice over two consecutive subframes.

Also, when a coding rate for control information is 1/12 (i.e. when an L1/L2 CCH occupies eight CCEs), repetition section 214 repeats a response signal twice and outputs three identical response signals to spreading section 215 over three consecutive subframes (i.e. repetition factor=3). Therefore, in this case, mobile station 200 transmits the same response signal three times over three consecutive subframes.

Spreading section 215 performs first spreading of a response signal by the ZAC sequence set in control section 209, and outputs the response signal after first spreading to IFFT section 216. That is, spreading section 215 spreads a response signal using the ZAC sequence of the amount of cyclic shift corresponding to the resources selected in control section 209.

IFFT section 216 performs an IFFT of the response signal after first spreading, and outputs the response signal after the IFFT to CP attaching section 217.

CP attaching section 217 attaches the same signal as the tail end part of the response signal after the IFFT, to the head of that response signal as a CP.

Spreading section 218 performs second spreading of the response signal(s) with a CP by the block-wise spreading code sequence set in control section 209, and outputs the response signal after second spreading to multiplexing section 219. That is, spreading section 218 performs second spreading of the response signal after first spreading using the block-wise spreading code sequence corresponding to the resources selected in control section 209.

IFFT section 221 performs an IFFT of the reference signal, and outputs the reference signal after an IFFT to CP attaching section 222.

CP attaching section 222 attaches the same signal as the tail end part of the reference signal after an IFFT, to the head of the reference signal as a CP.

Spreading section 223 spreads the reference signal with a CP by a predetermined orthogonal sequence, and outputs the reference signal after spreading to multiplexing section 219.

Multiplexing section 219 time-multiplexes the response signal after second spreading and the reference signal after spreading in one slot, and outputs the multiplexed signal to radio transmitting section 220.

Radio transmitting section 220 performs transmission processing such as D/A conversion, amplification and up-conversion on the response signal after second spreading, and transmits the resulting signal from antenna 201 to base station 100 (in FIG. 2).

Next, sequence control in control section 209 will be explained in detail.

The mobile stations that require repetition transmission of response signals are only part of mobile stations located distant from the base station, that is, only a small number of mobile stations located near cell edges.

Further, to reduce the deterioration of error rate performance of control information, the coding rates for control information directed to mobile stations located near a cell edge are set lower. Accordingly, the number of CCEs occupied by L1/L2 CCHs for mobile stations located near cell edges increases. For example, among a coding rate=2/3 (the number of occupied CCEs=1), a coding rate=1/6 (the number of occupied CCEs=4) and a coding rate=1/12 (the number of occupied CCEs=8), a coding rate for a mobile station located near a cell edge is a coding rate=1/6 (the number of occupied CCEs=4) or a coding rate=1/12 (the number of occupied CCEs=8).

As described above, when one L1/L2 CCH occupies a plurality of CCEs, one L1/L2 CCH occupies a plurality of consecutive CCEs. Further, when one L1/L2 CCH occupies a plurality of CCEs, only a PUCCH associated with the CCE of the smallest number among those plurality of CCEs is used to transmit a response signal. Therefore, few resources are required for repetition transmission of a response signal. If the greatest number of L1/L2 CCHs per subframe is k, L1/L2 CCHs, which occupies m CCEs for a mobile station that requires repetition transmission of a response signal, only exist k/m. Therefore, it is enough to prepare resources equal to k/m at the maximum used for repetition transmission of a response signal. The greatest number of L1/L2 CCHs per subframe (k) is limited by the total number of CCEs that can be used to report a downlink data resource allocation result on a per subframe basis (i.e. the total number of CCEs that can be present in one subframe).

Then, with the present embodiment, the number of resources that can be selected in control section 209 decreases when the number of times a response signal is transmitted increases.

Further, with the present embodiment, to reduce the number of resources that can be selected in control section 209 when the number of times a response signal is transmitted increases, a plurality of resources defined by ZAC #0 to ZAC #11 and BW #0 to BW #2 are divided into a plurality of selected ranges according to the number of times a response signal is transmitted, and the selected ranges become smaller when the number of times a response signal is transmitted increases.

Further, with the present embodiment, the number of resources that control section 209 can select upon each transmission of a response signal is set according to the coding rate for control information (i.e. coding rate for an L1/L2 CCH) or the number of CCEs occupied by an L1/L2 CCH.

Figure 4:
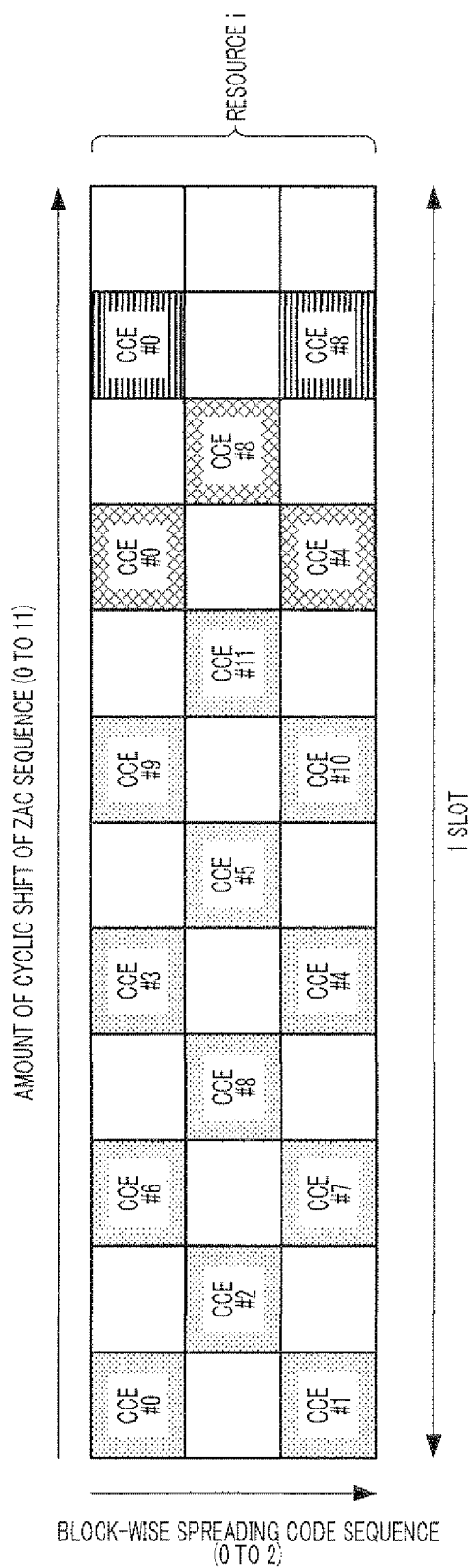
FIG. 4 shows resource allocation according to Embodiment 1 of the present invention.

To be more specific, with the present embodiment, as shown in FIG. 4, when twelve resources associated with CCE #0 to CCE #11 are prepared for the first transmission of a response signal, three resources associated with CCE #0, CCE #4 and CCE #8 are prepared for a second transmission of the response signal and two resources associated with CCE #0 and CCE #8 are prepared for a third transmission of the response signal. Also, the above twelve resources are included in a range formed with ZAC #0 to ZAC #7 and BW #0 to BW #2, the above three resources are included in a range formed with ZAC #8 to ZAC #9 and BW #0 to BW #2, and the above two resources are included in a range formed with ZAC #10 and BW #0 to BW #2.

Further, with the present embodiment, taking into account that the maximum number of mobile stations receiving downlink data is the same as the total number of CCEs that can be used in an L1/L2, the number of resources that control section 209 can select upon the first transmission of a response signal is the same as the total number of CCEs that can be used in an L1/L2 CCH (i.e. twelve CCEs of CCE #0 to CCE #11 in FIG. 4). That is, with the present embodiment, the resources that control section 209 can select upon the first transmission of a response signal are the resources associated with all CCE numbers that can be used for an L1/L2 CCH (i.e. CCE #0 to CCE #11 in FIG. 4), respectively. Therefore, the number of resources that control section 209 can select upon second or subsequent transmission of the response signal becomes less than the above total number. That is, the resources that control section can select upon second or subsequent transmission of a response signal are associated with part of CCE numbers among all CCE numbers above.

Further, with the present embodiment, taking into account the fact that one, two, four or eight CCE(s) is/are occupied in order from CCE #0, the resources that control section 209 can select upon second or subsequent transmission of a response signal are associated with CCE numbers having regular intervals between each other. In FIG. 4, the above interval is four upon second transmission of a response signal (CCE #0, CCE #4 and CCE #8) and eight upon third transmission of a response signal (CCE #0 and CCE #8).

Figure 5:
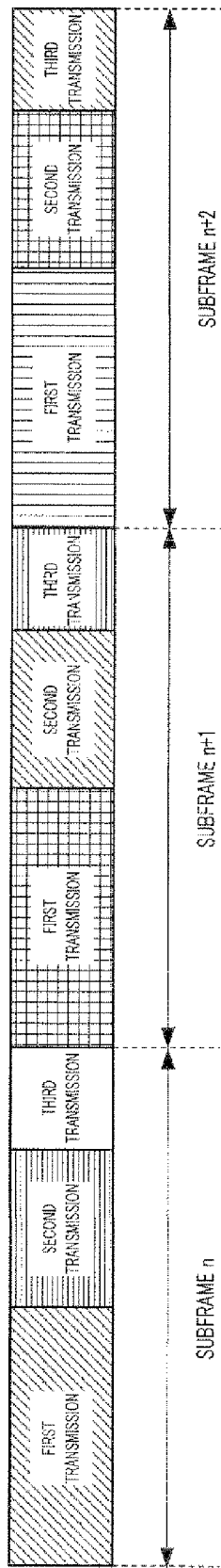
FIG. 5 shows subframes according to Embodiment 1 of the present invention.

Therefore, in mobile station 200 receiving an L1/L2 CCH occupying one CCE of a coding rate 2/3, repetition section 214 does not perform repetition, so that, only in subframe n shown in FIG. 5, control section 209 selects one resource associated with the CCE number in the received L1/L2 CCH among the twelve resources associated with CCE #0 to CCE #11 allocated to the first transmission.

Further, in mobile station 200 receiving an L1/L2 CCH occupying two CCEs of a coding rate 1/3, repetition section 214 does not perform repetition, so that, only in subframe n shown in FIG. 5, control section 209 selects one resource associated with the smallest CCE number in the received L1/L2 CCH among the twelve resources associated with CCE #0 to CCE #11 allocated to the first transmission. For example, control section 209 in mobile station 200 receiving an L1/L2 CCH occupying two CCEs, CCE #1 and CCE #2, selects the resource associated with CCE #1 among CCE #0 to CCE #11 only upon the first transmission of a response signal.

Further, in mobile station 200 receiving an L1/L2 CCH occupying four CCEs of a coding rate 1/6, repetition section 214 performs repetition once, so that, in subframe n shown in FIG. 5, control section 209 selects one resource associated with the smallest CCE number in the received L1/L2 CCH among the twelve resources associated with CCE #0 to CCE #11 allocated to the first transmission. Also, in subframe n+1 shown in FIG. 5, control section 209 selects one resource associated with the CCE number in received L1/L2 CCH, among three resources associated with CCE #0, CCE #4, and CCE #8 allocated to the second transmission. For example, control section 209 in mobile station 200 receiving an L1/L2 CCH occupying four CCEs, CCE #1 to CCE #4, selects the resource associated with CCE #1 among CCE #0 to CCE #11 upon the first transmission of a response signal and selects the resource associated with CCE #4 among CCE #0, CCE #4 and CCE #8 upon a second transmission of the response signal. Further, for example, control section 209 in mobile station 200 receiving an L1/L2 CCH occupying four CCEs, CCE #8 to CCE #11, selects the resource associated with CCE #8 among CCE #0 to CCE #11 upon the first transmission of a response signal and selects the resource associated with CCE #8 among CCE #0, CCE #4 and CCE #8 upon a second transmission of the response signal.

Further, in mobile station 200 receiving an L1/L2 CCH occupying eight CCEs of a coding rate 1/12, repetition section 214 performs repetition twice, so that, in subframe n shown in FIG. 5, control section 209 selects one resource associated with the smallest CCE number in the received L1/L2 CCH among the twelve resources associated with CCE #0 to CCE #11 allocated to the first transmission. Also, in subframe n+1 shown in FIG. 5, control section 209 selects one resource associated with the CCE number in received L1/L2 CCH, among three resources associated with CCE #0, CCE #4, and CCE #8 allocated to a second transmission. Furthermore, in subframe n+2 shown in FIG. 5, control section 209 selects one resource associated with the CCE number in received L1/L2 CCH, among two resources associated with CCE #0 and CCE #8 allocated to the third transmission. For example, control section 209 in mobile station 200 receiving an L1/L2 CCH occupying eight CCEs, CCE #1 to CCE #8, selects the resource associated with CCE #1 among CCE #0 to CCE #11 upon the first transmission of a response signal, selects the resource associated with CCE #4, which is a smaller number, among CCE #0, CCE #4 and CCE #8 upon a second transmission of the response signal, and selects the resource associated with CCE #8 in CCE #0 and CCE #8 upon a third transmission of the response signal. For example, control section 209 in mobile station 200 receiving an L1/L2 CCH occupying eight CCEs, CCE #4 to CCE #11, selects the resource associated with CCE #4 among CCE #0 to CCE #11 upon the first transmission of a response signal, selects the resource associated with CCE #4, which is a smaller number, among CCE #0, CCE and CCE #8 upon a second transmission of the response signal, and selects the resource associated with CCE #8 in CCE #0 and CCE #8 upon a third transmission of the response signal.

Figure 6:
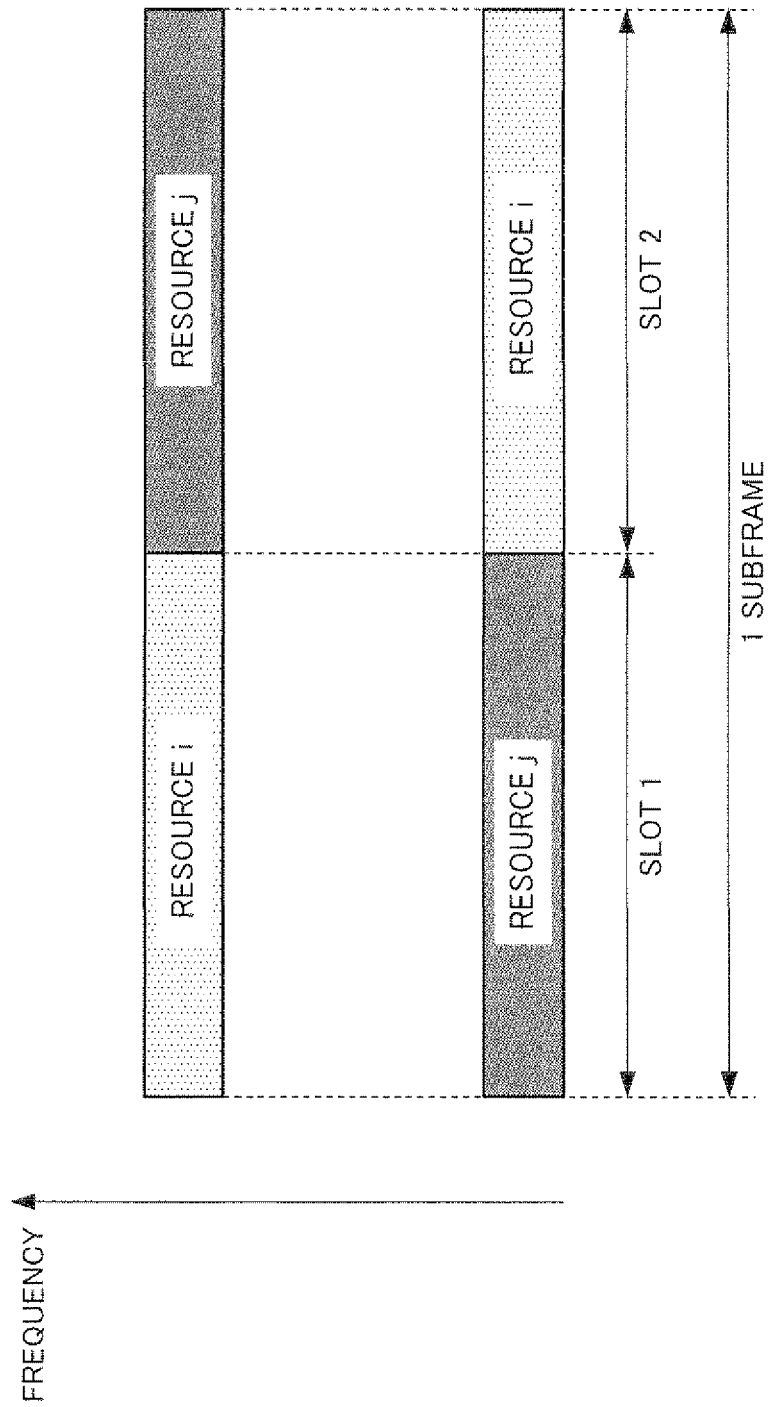
FIG. 6 shows frequency hopping according to Embodiment 1 of the present invention.

Resource i shown in FIG. 4 is defined twice in repetition in one subframe, and frequency-hopped between slot 1 and slot 2 in one subframe as shown in FIG. 6.

In this way, according to the present embodiment, it is possible to allocate downlink data for mobile stations that require repetition transmission of a response signal without restricting scheduling in a base station, and it is possible to significantly reduce and minimize a waste of physical resources involved in repeating transmitting a response signal without restrictions on scheduling in the base station.

Embodiment 2

The present embodiment differs from Embodiment 1 in limiting resources that control section 209 can select upon second or subsequent transmission of a response signal to resources associated with the first half of CCE numbers or the second half of CCE numbers of all CCE numbers that can be used in an L1/L2 CCH (i.e. CCE #0 to CCE #11 in FIG. 4).

With Embodiment 1, in order not to give restrictions on scheduling in the base station, the resources used for repetition transmission of a response signal have been prepared in every four CCE numbers upon a second transmission and every eight CCE numbers upon a third transmission.

By contrast with this, with the present embodiment, the minimum restrictions on occupying the first eight or four CCEs, or the second eight or four CCEs among CCE #0 to CCE #11, are provided on an L1/L2 CCH for a mobile station that requires repetition transmission of a response signal.

Figure 7:
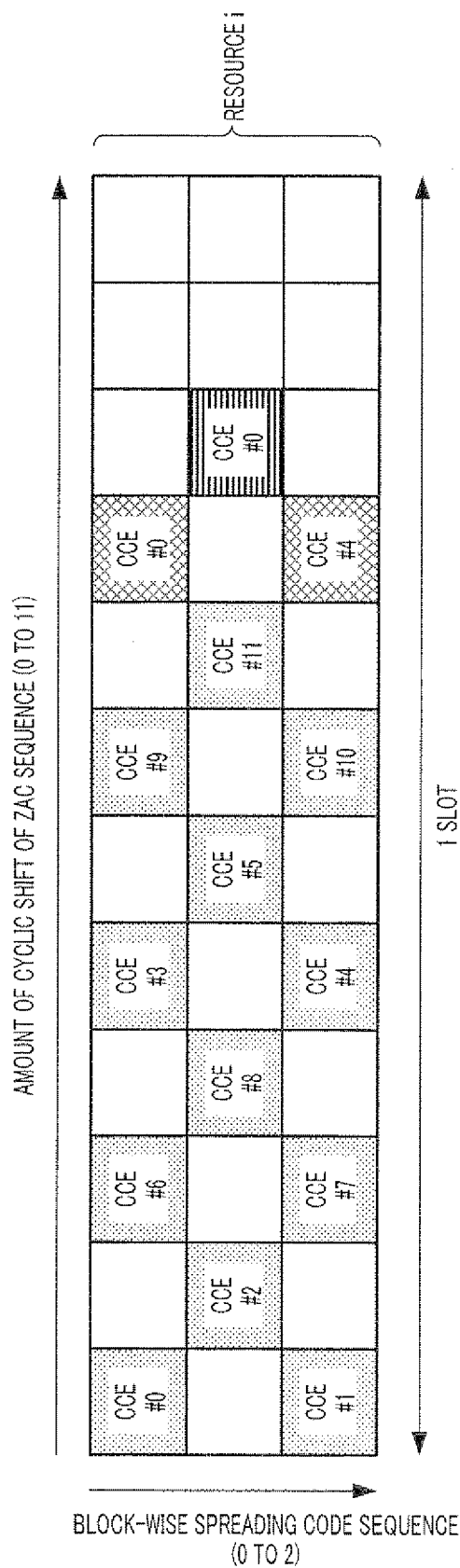
FIG. 7 shows resource allocation according to Embodiment of the present invention (when resources are limited to the resources associated with the first half of CCE numbers)

For example, when the minimum restriction on occupying only the first eight or first four CCEs among CCE #0 to CCE #11 is provided on an L1/L2 CCH for a mobile station that requires repetition transmission of a response signal, as shown in FIG. 7, it is possible to limit resources used for repetition transmission of a response signal, to only two resources associated with CCE #0 and CCE #4 upon a second transmission and only one resource associated with CCE #0 upon a third transmission.

Figure 8:
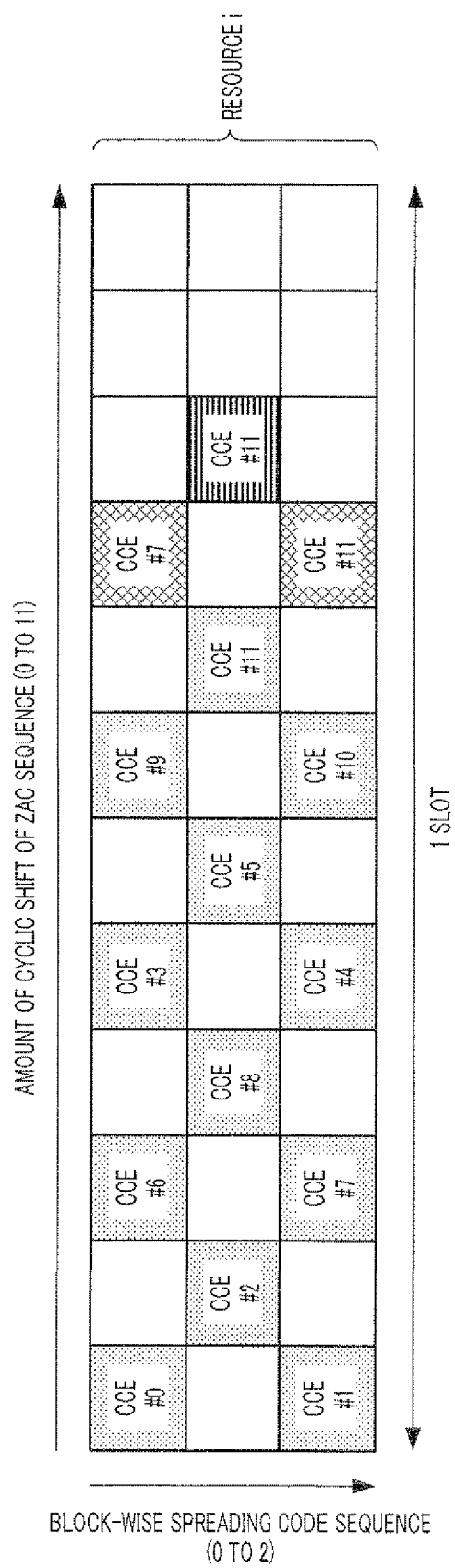
FIG. 8 shows resource allocation according to Embodiment of the present invention (when resources are limited to the resources associated with the second half of CCE numbers)

Further, for example, when the minimum restriction on occupying only the second eight or second four CCEs among CCE #0 to CCE #11 is provided an L1/L2 CCH for a mobile station that requires repetition transmission of a response signal, as shown in FIG. 8, it is possible to limit resources used for repetition transmission of a response signal, to only two resources associated with CCE #7 and CCE #11 upon a second transmission and only one resource associated with CCE #11 upon a third transmission.

Consequently, according to the present embodiment, it is not necessary to prepare resources associated with CCE numbers in the middle part as resources for repeating transmitting a response signal among CCE #0 to CCE #11, so that it is possible to reduce a waste of physical resources further involved in repeating transmitting a response signal while minimizing restrictions on scheduling in the base station.

Figure 9:
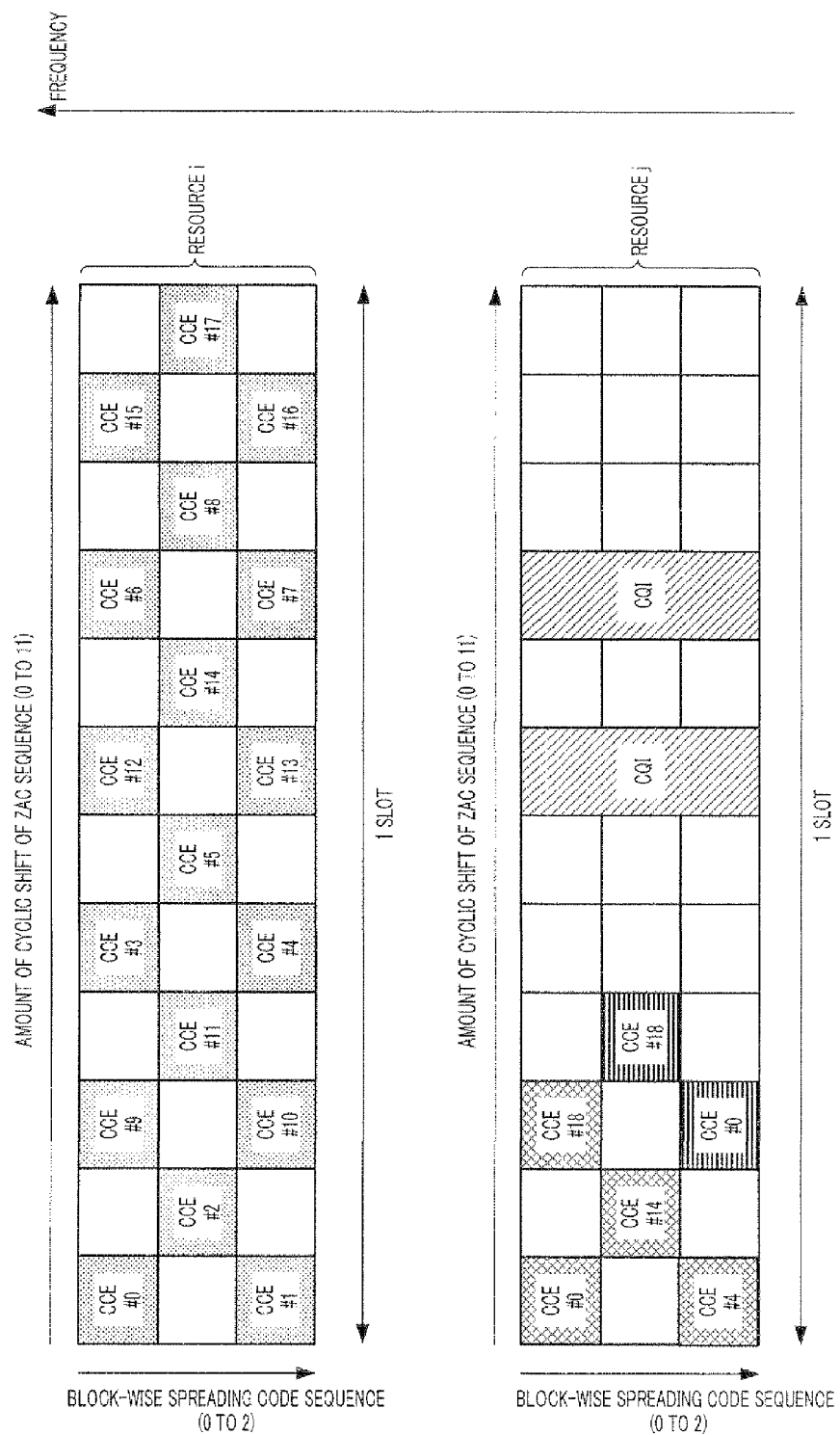
FIG. 9 shows resource allocation according to Embodiment 2 of the present invention (when two frequency bands, resource i and resource j, are used for a PUCCH)

As shown in FIG. 9, when two frequency bandwidths, resource i and resource j, are prepared for a PUCCH and all CCEs that can be used for an L1/L2 CCH are CCE #0 to CCE #17, as described above, it is possible to limit resources for repeating transmitting a response signal to four resources associated with CCE #0, CCE #4, CCE #14 and CCE #18 upon a second transmission and two resources associated with CCE #0 and CCE #18 upon a third transmission. The CQIs in FIG. 9 are resources reserved in advance in the base station to transmit channel quality indicators.

Embodiment 3

When a plurality of response signals from a plurality of mobile stations are code-multiplexed, those response signals are normally subject to transmission power control, so that the power of the advanced waves (desired waves) of those response signals are approximately the same in the base station.

Further, the power difference is significant between the advanced wave (the direct wave) and a delayed wave with a response signal transmitted from a mobile station located near the base station, and therefore, even when a plurality of response signals from a plurality of mobile stations located near the base station are code-multiplexed, there is not influence of inter-code interference on the cyclic shift axis due to delayed waves.

On the other hand, in a response signal transmitted from a mobile station located distant from the base station, that is, a mobile station located near a cell edge, in many cases, the direct wave does not arrive at the base station and an indirect wave arrives at the base station as an advanced wave, and therefore, the power difference between an advanced wave and a delayed wave becomes smaller than that of a response signal transmitted from the mobile station located near the base station. That is, when a plurality of response signals from a plurality of mobile stations located near cell edges are code-multiplexed, the influence of code-interference on the cyclic shift axis due to delayed wave increases.

Therefore, the cyclic shift interval for response signals transmitted from mobile stations located near the base station, that is, mobile stations that do not require repetition transmission of a response signal can be shorter. On the other hand, it is necessary to make longer the cyclic shift interval for response signals transmitted from mobile stations located near cell edges, that is, from mobile stations that require repetition transmission of a response signal.

Then, with the present embodiment, the cyclic shift interval between resources that control section 209 can select becomes longer when the number of times a response signal is transmitted increases.

Figure 10:
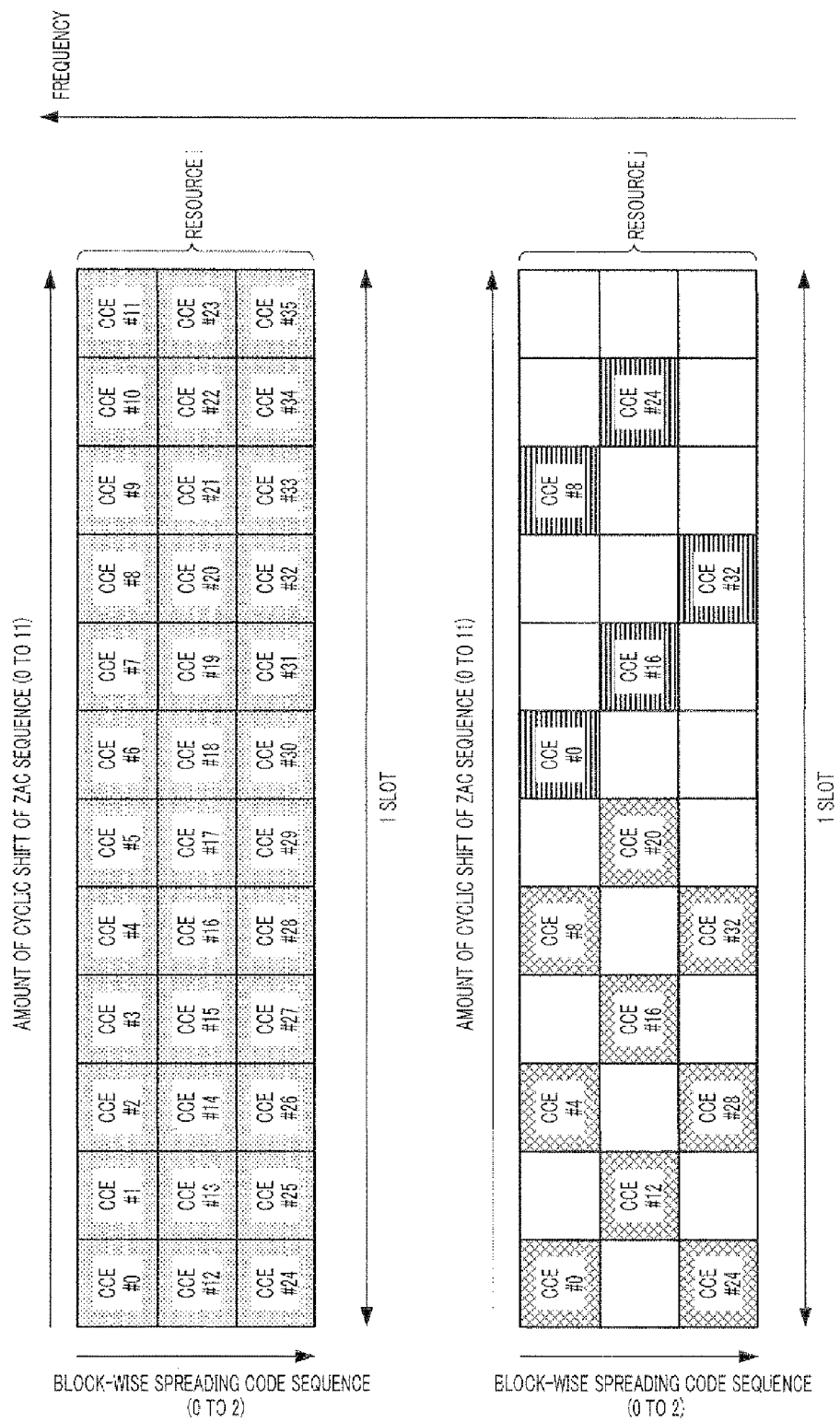
FIG. 10 shows resource allocation (Example 1) according to Embodiment 3 of the present invention.
Figure 11:
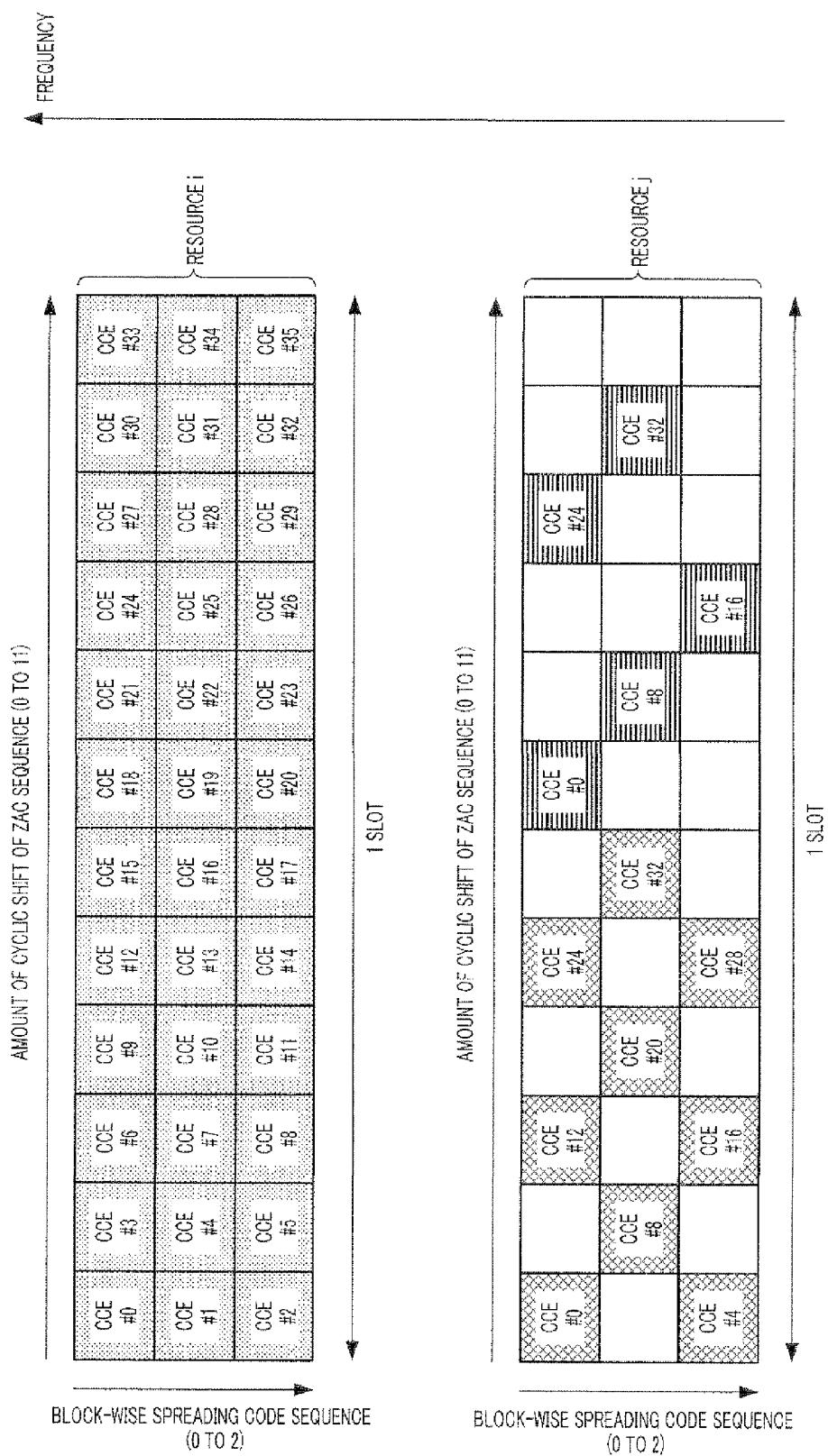
FIG. 11 shows resource allocation (Example 2) according to Embodiment 3 of the present invention.

To be more specific, for example, as shown in FIG. 10 or FIG. 11, the cyclic shift intervals is "1" upon the first transmission of a response signal (in CCE #0 to CCE #35), the cyclic shift interval is "2" upon a second transmission of the response signal (between CCE #0, CCE #4, CCE #8, CCE #12, CCE #16, CCE #20, CCE #24, CCE #28, and CCE #32) and the cyclic shift interval is "3" upon a third transmission of the response signal (between CCE #0, CCE #8, CCE #16, CCE #24, and CCE #32).

In this way, according to the present embodiment, it is possible to improve the efficiency of resource use for a response signal.

The resources prepared for the first transmission of a response signal in FIG. 10 or FIG. 11 (i.e. the resources associated with CCE #0 to CCE #35) are neighboring each other on the cyclic shift axis, and used in not only mobile stations located near the base station but also used in mobile stations located near cell edges (i.e. mobile stations that require repetition transmission of a response signal). However, for example, in the mobile station receiving the L1/L2 CCH occupying four CCEs, CCE #4 to CCE #7, only the resource associated with CCE #4 is used for the first transmission of a response signal, so that resources associated with CCE #5 to CCE #7 are not used upon the first transmission of a response signal. Accordingly, even when a plurality of response signals from a plurality of mobile stations located near cell edges are code-multiplexed, inter-code interference on the cyclic shift axis does not occur in the first transmission of a response signal.

Figure 12:
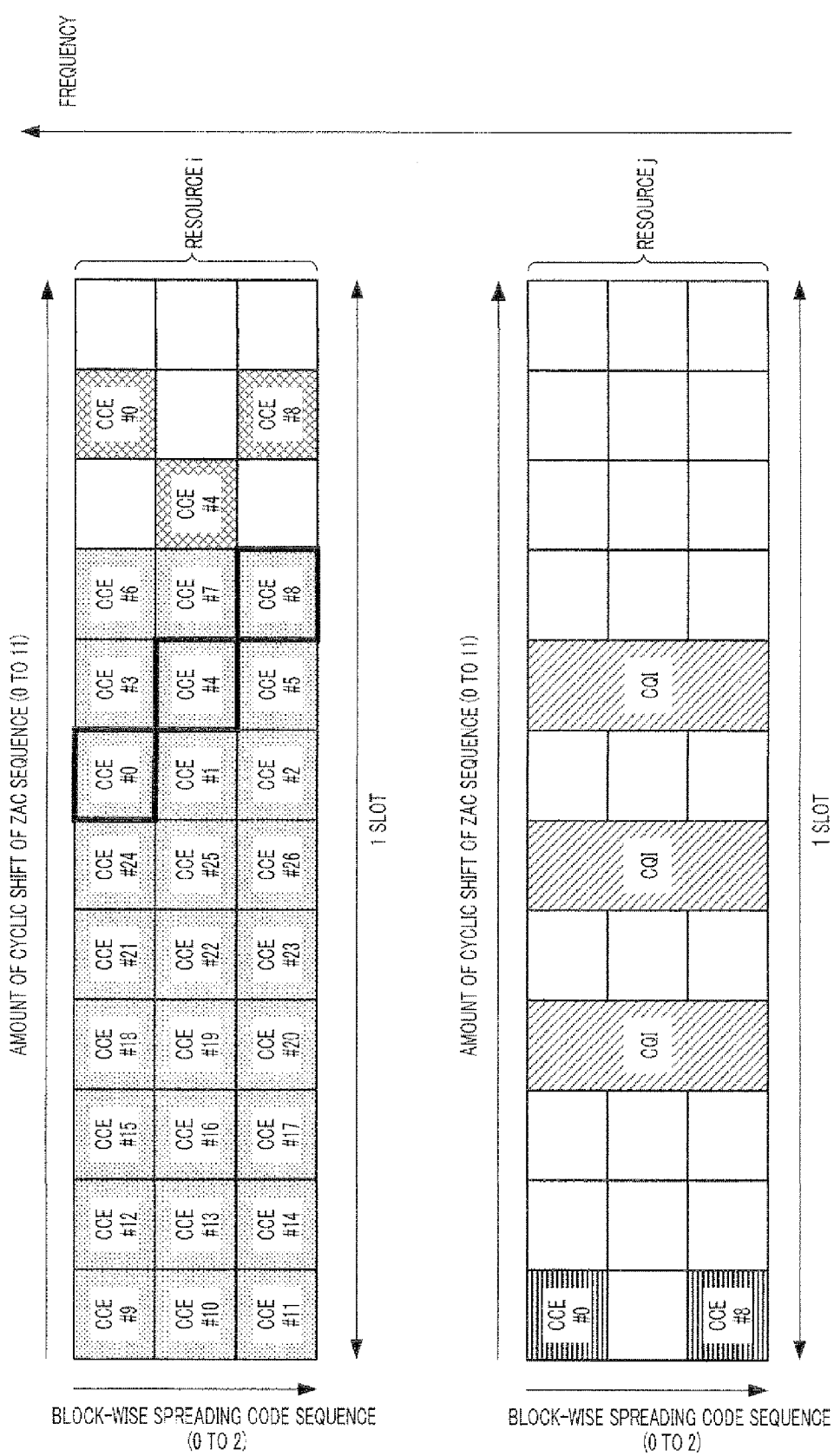
FIG. 12 shows resource allocation (Example 3) according to Embodiment 3 of the present invention.

Further, although inter-code interference occurs between ZAC sequences of varying amounts of cyclic shift such that a ZAC sequence of small amount of cyclic shift interferes with a ZAC sequence of great amount of cyclic shift, inter-code interference is less likely to occur such that a ZAC sequence of great amount of cyclic shift interferes with a ZAC sequence of small amount of cyclic shift. Accordingly, as in Embodiment 2, when CCEs that can be used in an L1/L2 CCH for a mobile station that requires repetition transmission of a response signal, are limited to part of CCEs, those part of CCEs may be associated with resources with great amount of cyclic shift in the resources for the first transmission of a response signal, as shown in FIG. 12. By this means, it is possible to lower the density of resource use neighboring the rear of the resources associated with part of CCEs, and reduce inter-code interference giving other response signals.

Embodiment 4

It is assumed that the number of mobile stations that require repetition transmission of a response signal is small when the cell radius is short, so that it is likely not to use resources for repeating transmitting a response signal (e.g. resources for second transmission and third transmission). Therefore, in this case, it is possible to use resources for repeating transmitting a response signal for transmitting uplink data.

Further, in 3GPP-LTE, to reduce PAPR (Peak to Average Power Ratio) of signals transmitted from mobile stations, the SC-FDMA (Single Carrier-Frequency Division Multiple Access) scheme is employed in uplink signals. Therefore, taking into account of easy resource allocation in the base station, it is preferable that a resource that can be used for given data and a resource that can be used for other data are consecutive and neighboring. This is because a waveform of data allocated to discontinuous resources generally becomes an OFDM signal waveform and PAPR increases.

Figure 13:
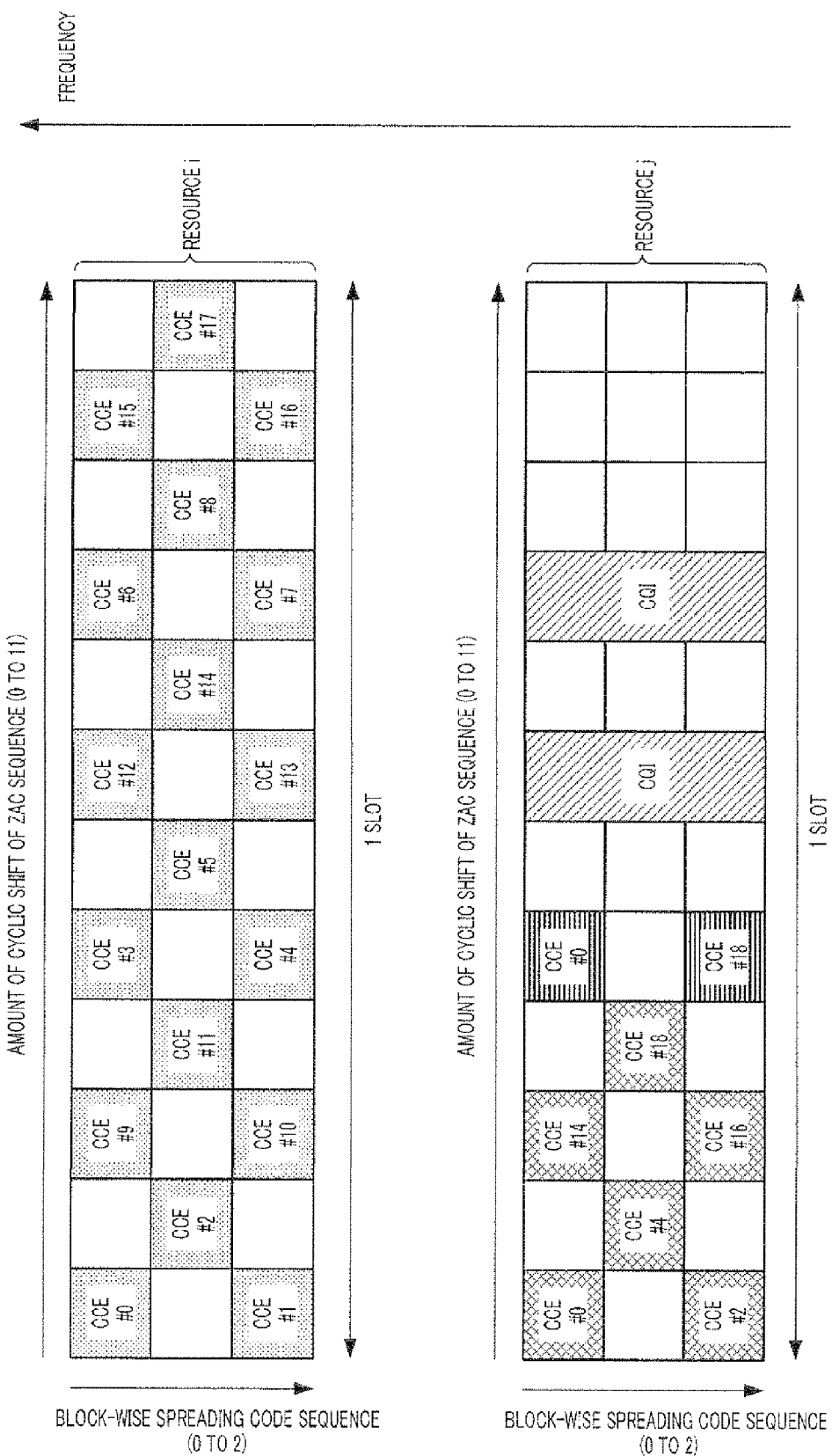
FIG. 13 shows resource allocation according to Embodiment 4 of the present invention.
Figure 14:
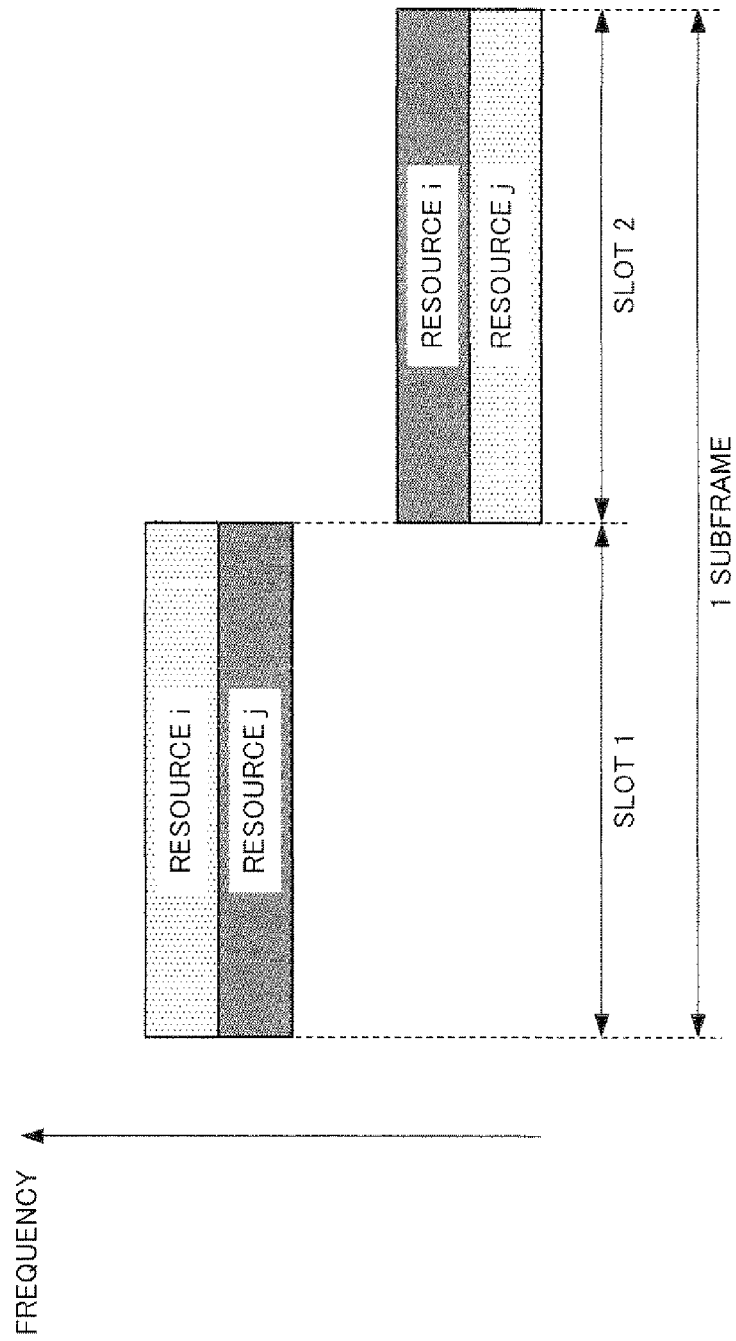
FIG. 14 shows frequency hopping according to Embodiment 4 of the present invention.

Therefore, resource i and resource j shown in FIG. 13 may be arranged in the frequency domain, as shown in FIG. 14. Resource i is formed with resources for transmitting a response signal for the first time and uplink data resources. Further, resource j is formed with resources for repeating transmitting a response signal, resources for repeating transmitting CQIs and resources for uplink data. By focusing the fact that a PUCCH is arranged in the outermost system band, in FIG. 14, resource j, which is not often used, is arranged inside the frequency band and successive to the frequency band for uplink data. Frequency hopping patterns between slots are set to keep this continuity. That is, the frequency hopping pattern is set such that the resource block, which is arranged outwardly in slot n, is also arranged outwardly in slot n+1, and the resource block, which is arranged inwardly in slot n, is also arranged inwardly in slot n+1.

Embodiment 5

Figure 15:
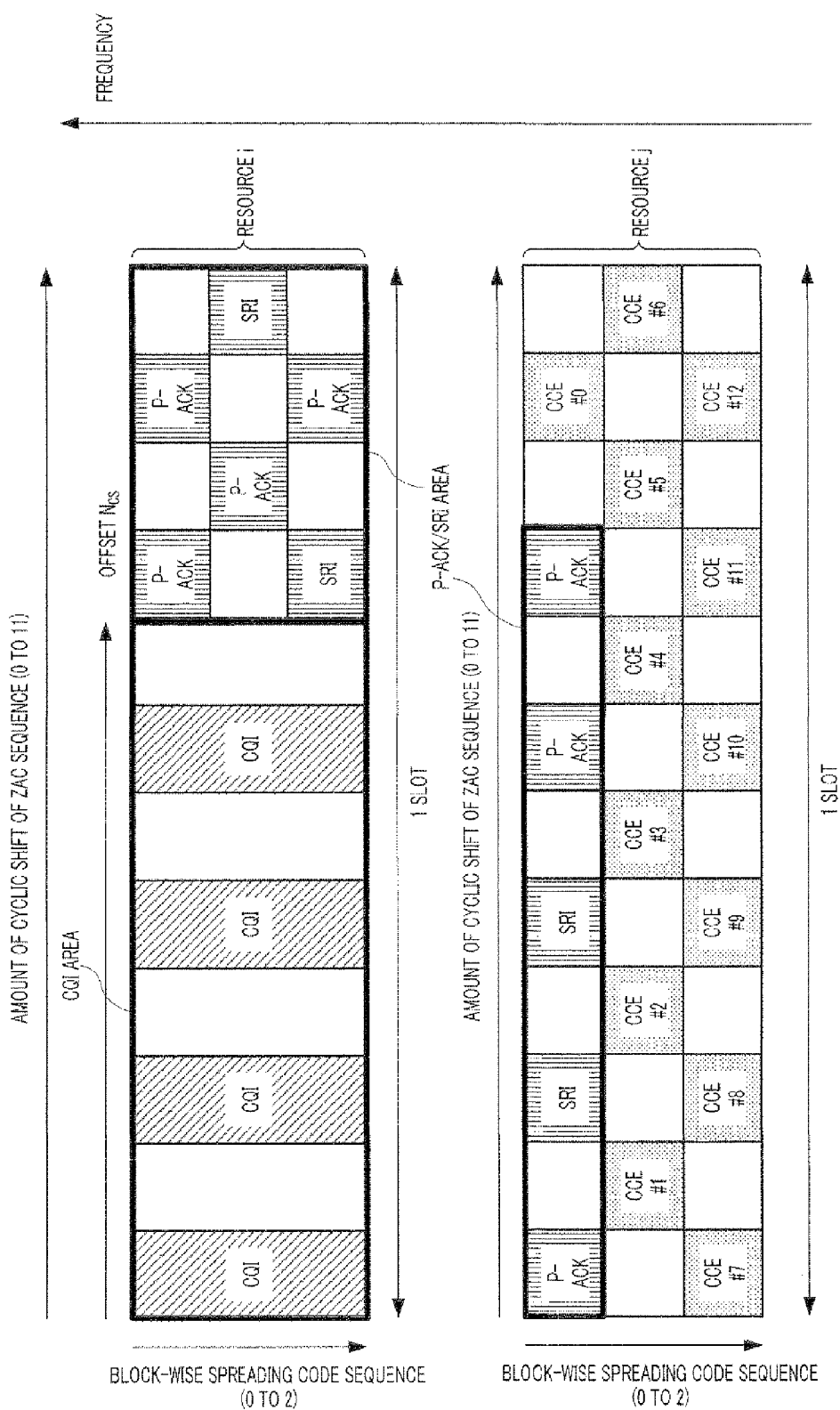
FIG. 15 shows resource allocation (in a conventional case) according to Embodiment 5 of the present invention.

As shown in FIG. 15, a resource area to transmit P-ACKs and a resource area to transmit SRIs (Scheduling Request Indicators) (i.e. P-ACK/SRI area) besides a resource area to transmit CQIs (CQI area) are reserved in advance in the base station.

P-ACK, refers to a response signal to downlink data that is produced at regular time intervals (e.g. VoIP calls) and is relatively a low transmission rate. This downlink data is subject to semi-persistent scheduling, so that downlink resources are allocated to mobile stations at predetermined cycles. In the case of semi-persistent scheduling, resource allocation results using L1/L2 CCHs are not reported, and therefore mobile stations cannot associate CCEs with PUCCHs. Consequently, the base station reports physical resources for response signals to downlink data including VoIP calls, to mobile stations separately in advance.

Further, an SRI refers to a signal to request uplink resource allocation from a mobile station to the base station when the mobile station produces uplink data. Further, the base station reports SRI physical resources to mobile stations separately in advance.

When the resource allocation is adopted shown in FIG. 15, a P-ACK/SRI area is reported from the base station to the mobile station in advance. This is reported by offset $N_{CS}$ and offset $Delta_{AN}$. Offset $N_{CS}$ refers to a value showing from which positions on the cyclic shift axis P-ACK/SRI area is started, and offset $Delta_{AN}$ refers to a value showing total numbers of P-ACK transmission resources and SRI transmission resources. For example, in FIG. 15, $N_{CS}=8$ and $Delta_{AN}=11$.

Resource i and resource j shown in FIG. 15 are arranged in the frequency domain as shown in FIG. 14.

Here, when a cell radius is short or many cells are densely present and so on, it is assumed that the number of mobile stations that require repetition transmission of response signals is small, and therefore a waste of physical resources is likely to occur if resource areas for repeating transmitting response signals (i.e."repetition transmission area") are allocated separately from other resource areas.

On the other hand, when a cell radius is long or a cell is isolated, it is assumed that there are many mobile stations that require repetition transmission of a response signal, and therefore a waste of physical resources is less likely to occur even if the repetition transmission area is allocated separately from other resource areas. Also, by allocating a repetition transmission area separately from other resource areas, it is possible to reduce restrictions on scheduling in the base station.

Then, with the present embodiment, a repetition transmission area is defined as below. A repetition transmission area is reported from the base station to a mobile station by offset $\text{Delta}_{RP}$ in advance. Offset $\text{Delta}_{RP}$ refers to the value showing the position where a repetition transmission area starts, and showing the amount of offset from the position where the P-ACK/SRI area starts.

Figure 16:
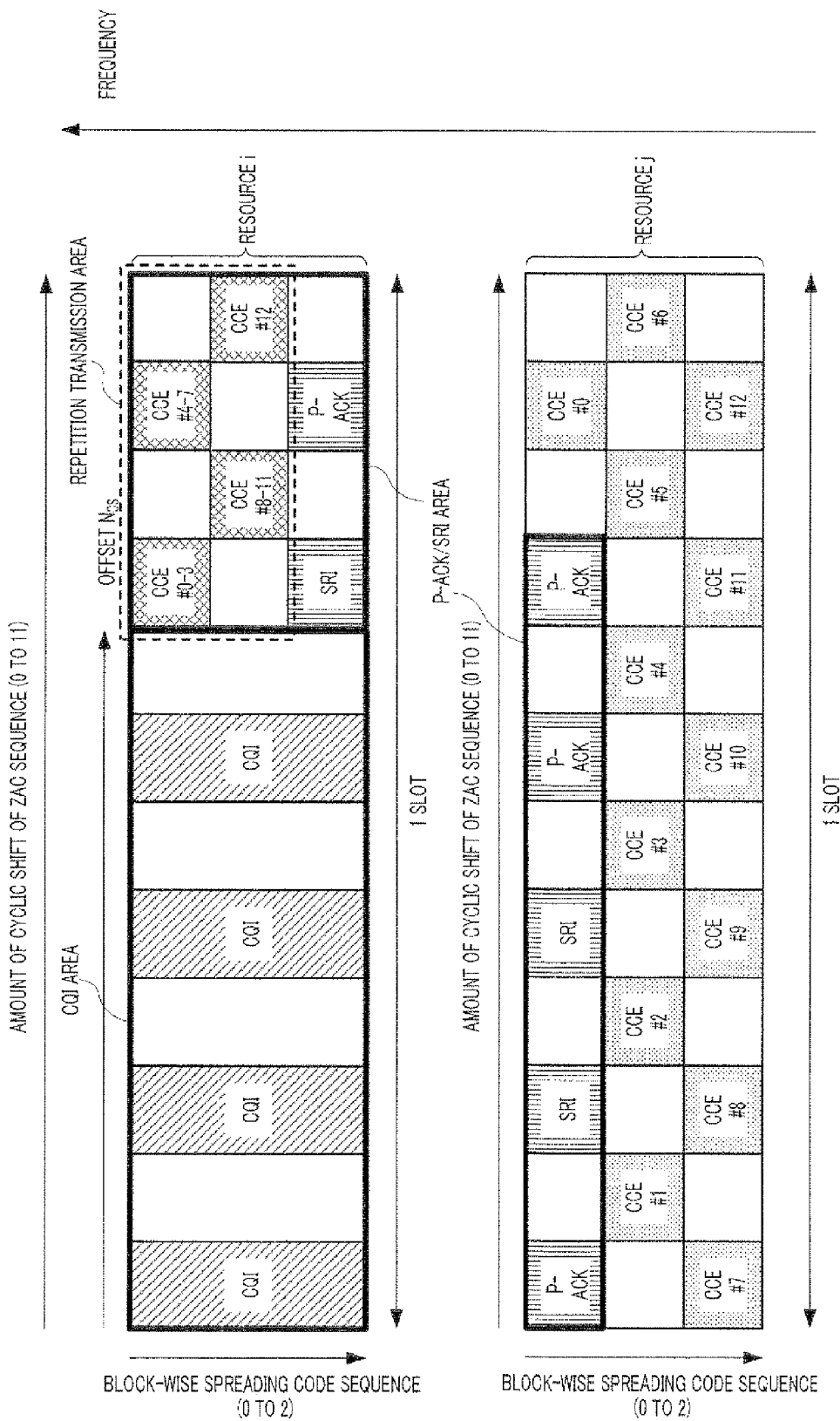
FIG. 16 shows resource allocation (Example 1) according to Embodiment 5 of the present invention.

FIG. 16 shows a resource allocation example (allocation example 1) suitable when a cell radius is short and there are few VoIP calls. When the cell radius is short, to reduce a waste of physical resources, it is preferable to overlap the repetition transmission area with other resource areas. Further, when there are few VoIP calls, P-ACK transmission resources are not used often. Then, with allocation example 1, repetition transmission areas overlap with P-ACK/SRI areas. Here, $\text{Delta}_{RP}=0$ as an example.

An L1/L2 CCH for a mobile station that repeats transmitting a response signal is encoded with a low coding rate, and therefore the number of CCEs occupied by that L1/L2 CCH increases. Consequently, with the present embodiment, similar to Embodiment 1, one resource for repeating transmitting a response signal is allocated to four CCEs.

Figure 17:
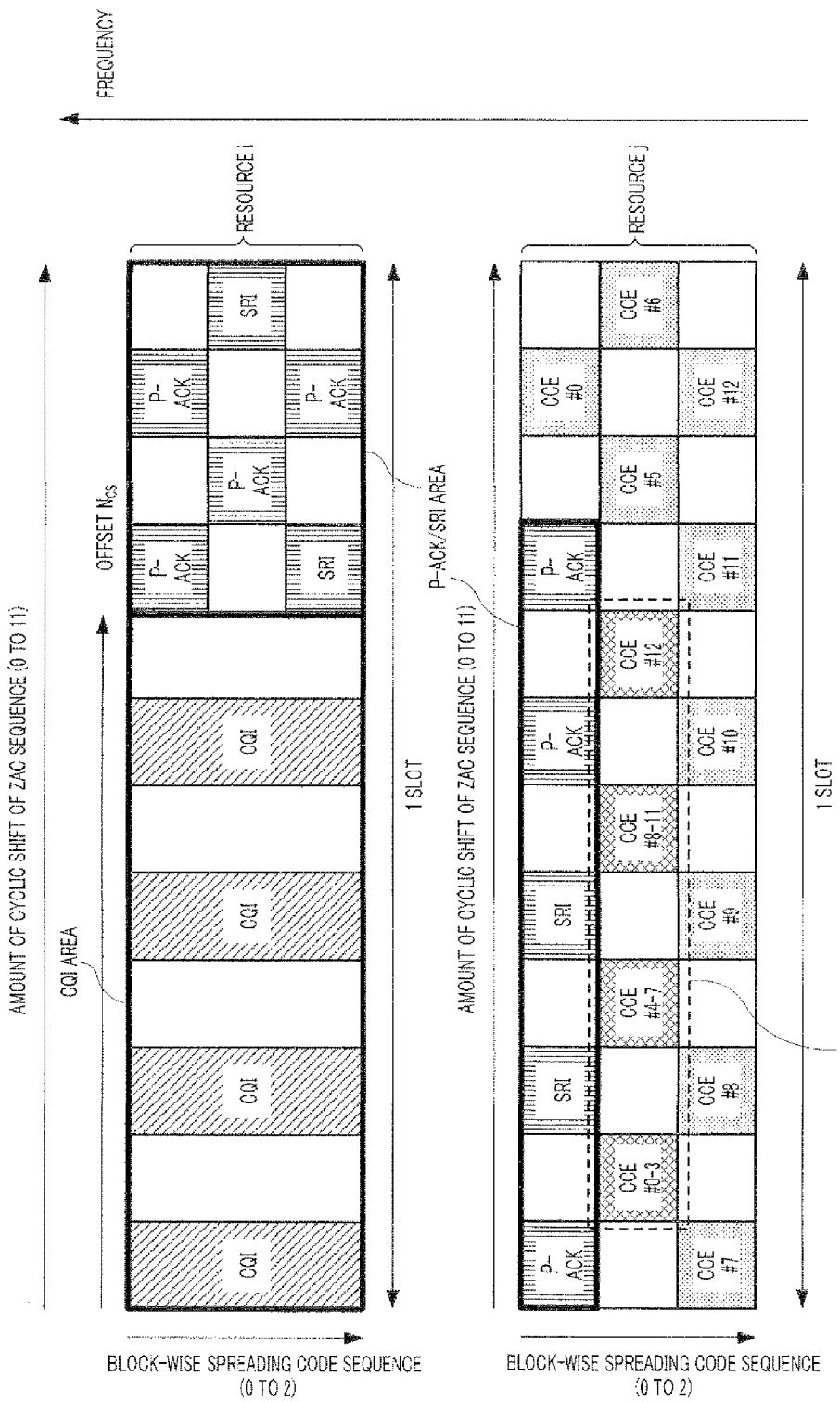
FIG. 17 shows resource allocation (Example 2) according to Embodiment 5 of the present invention.

Further, FIG. 17 shows a resource allocation example (allocation example 2) suitable for a short cell radius and many VoIP calls. When there are many VoIP calls, P-ACK transmission resources are often used. Then, with allocation example 2, the resource area for the first transmission of a response signal overlaps the repetition transmission area. Here, $\text{Delta}_{RP}=\text{Delta}_{AN}+1$ as an example.

Figure 18:
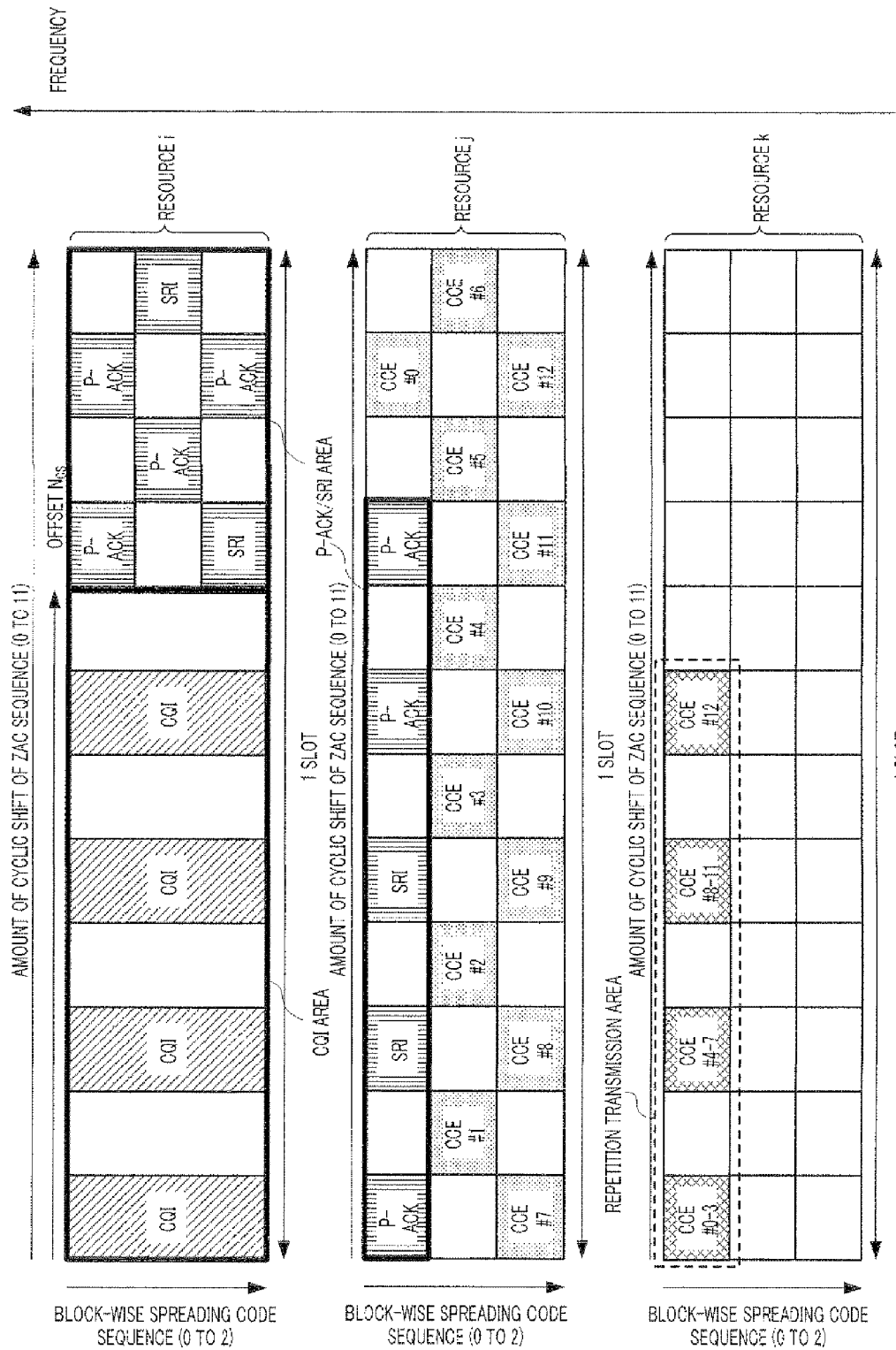
FIG. 18 shows resource allocation (Example 3) according to Embodiment 5 of the present invention.

Further, FIG. 18 shows a resource allocation example (allocation example 3) suitable for the long cell radius. With allocation example 3, the repetition transmission area is allocated separately from other resource areas (i.e. a CQI area, a P-ACK/SRI area and a resource area for the first transmission of a response signal). Here, $\text{Delta}_{RP}=\text{Delta}_{AN}+13$ as an example.

Figure 19:
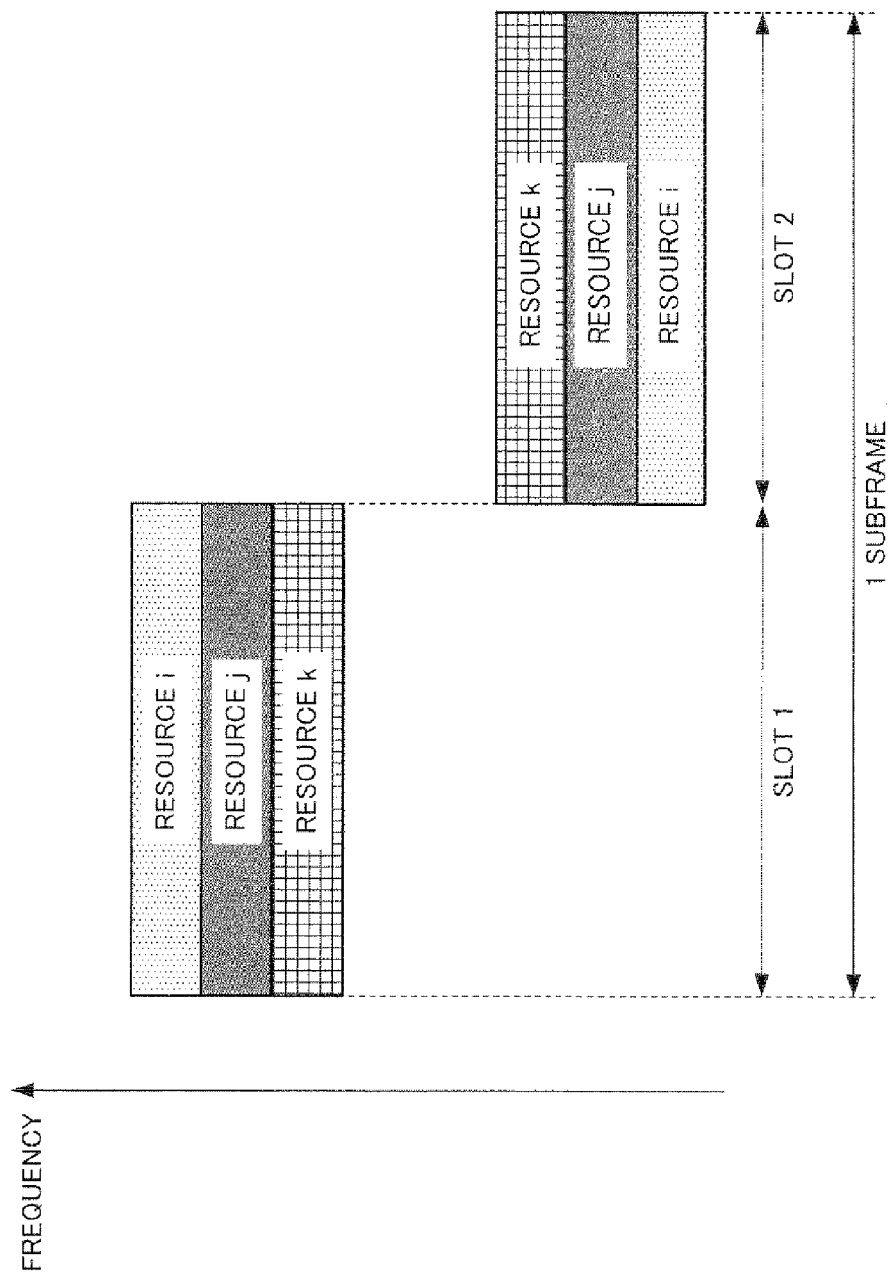
FIG. 19 shows frequency hopping according to Embodiment 5 of the present invention.

Resource i, resource j and resource k shown in FIG. 18 may be arranged in the frequency domain, as shown in FIG. 19.

In this way, according to the present embodiment, $\text{Delta}_{RP}$ shows the position where the repetition transmission area starts. Further, the minimum value of $\text{Delta}_{RP}$ is "0" and the maximum value of $\text{Delta}_{RP}$ is "the maximum value of $\text{Delta}_{AN}$ plus the maximum number of CCEs." "The maximum number of CCEs" equals the total number of CCEs that can be allocated when the maximum number of OFDM symbols has been allocated to use for an L1/L2 CCH. If the number of CCEs that can be allocated is four when the number of OFDM symbol used for an L1/L2 CCH is one, the number of CCEs that can be allocated is eight when the number of OFDM symbols used for an L1/L2 CCH is two, the number of CCEs that can be allocated is thirteen when the number of OFDM symbols used for an L1/L2 CCH is three, and unless four or more OFDM symbols are allocated to an L1/L2 CCH, the "maximum number of CCEs" becomes thirteen.

Offset $\text{Delta}_{RP}$ may be the amount of offset with respect to offset $\text{Delta}_{AN}$. In this case, if one resource for repeating transmitting a response signal is allocated to four CCEs, $\text{Delta}_{RP}$ becomes any value in a range from −(the maximum number of CCEs/4) to +($\text{Delta}_{AN}$+the maximum number of CCEs). Further, assume that $\text{Delta}_{AN}$>(the maximum number of CCEs/4), the range of $\text{Delta}_{RP}$ becomes smaller than in the case where offset $\text{Delta}_{RP}$ is the amount of offset from the position where the P-ACK/SRI area starts, and, as a result, it is possible to reduce the overhead for reporting the $\text{Delta}_{RP}$.

Embodiments of the present invention have been described above.

The CCE in the above embodiments is the minimum unit of frequency resources and time resources which the base station can use a downlink control channel for reporting a downlink data resource allocation result to mobile stations. Also, the CCE may be defined as the minimum unit of frequency resources and time resources which the base station can use a downlink control channel for reporting a uplink data resource allocation result to mobile stations. In this case, the base station distributes a plurality of CCEs to the CCEs used for reporting a downlink data resource allocation result and the CCEs used for reporting a uplink data resource allocation result, and allocates the distributed CCEs.

Further, the total number of CCEs that can be used per subframe (the total number of CCEs that can be present in one subframe) varies depending on the system bandwidth, the number of OFDM symbols that can be used as CCEs and the total number of control signals used for other than reporting downlink/uplink data resource allocation results (e.g. the total number of ACKs/NACKs in response to uplink data).

Further, with the above embodiments, assume that the number of information bits for an L1/L2 CCH for a mobile station near a cell edge and the number of information bits for an L1/L2 CCH for a mobile station near a base station are the same, the coding rate=2/3 when the number of occupied CCEs=1, the coding rate=1/6 when the number of occupied CCEs=4 and the coding rate=1/12 when the number of occupied CCEs=8. Meanwhile, there may be control information that can be used either for a mobile station near a cell edge or for a mobile station near a base station. In this case, the number of information bits of an L1/L2 CCH for a mobile station near a cell edge and the number of information bits of an L1/L2 CCH for a mobile station near a base station are slightly different. However, when the difference between both information bits is less than the total number of information bits, the coding rate ≈2/3 when the number of occupied CCEs=1, the coding rate ≈1/6 when the number of occupied CCEs=4 and the coding rate ≈1/12 when the number of occupied CCEs=8, so that the present invention is implemented as above. That is, the present invention is applicable to all communication systems in which the number of occupied CCEs increases when the coding rate is greater.

Further, a PUCCH used in the above-described embodiments is a channel for feeding back an ACK or NACK, and therefore may be referred to as an "ACK/NACK channel."

Further, the present invention is implemented as above when control information other than response signals is fed back.

A mobile station may be referred to as a "terminal station," "UE," "MT," "MS," and "STA (station)." Further, a base station may be referred to as a "Node B," "BS" and "AP." A subcarrier may be referred to as a "tone." A CP may be referred to as a "guard interval (GI)."

Further, the method of error detection is not limited to a CRC.

Further, the method of performing transformation between the frequency domain and the time domain is not limited to the IFFT and FFT.

Although cases have been explained with the above embodiments where the present embodiment is applied to a mobile station, the present invention may be applied to a stationary radio communication terminal apparatus and a radio communication relay station apparatus performing the same operations with a base station as a mobile station. That is, the present invention is applicable to all radio communication apparatuses.

Further, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSIs, and implementation using dedicated circuitry or general purpose processors is also possible. After LSI manufacture, utilization of a programmable FPGA (Field Programmable Gate Array) or a reconfigurable process or where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosures of Japanese Patent Application No. 2007-247848, filed on Sep. 25, 2007, and Japanese Patent Application No. 2008-145543, filed on Jun. 3, 2008, including the specifications, drawings and abstracts, are incorporated herein by reference in their entirety.

INDUSTRIAL APPLICABILITY

The present invention is applicable to, for example, mobile communication systems.

The invention claimed is:

1. A radio communication apparatus comprising:
a selection section that selects a resource from candidate resources among a plurality of resources based on a signal from another radio communication apparatus, wherein the plurality of resources are defined by a plurality of first sequences and a plurality of second sequences, wherein each first sequence of the plurality of first sequences has a different cyclic shift value from other first sequences, and each second sequence of the plurality of second sequences is orthogonal to other second sequences;
a first spreading section that performs first spreading of a response signal using a first sequence of having a cyclic shift value associated with the resource selected in the selection section; and
a second spreading section that performs second spreading of the response signal after the first spreading using a second sequence associated with the resource selected in the selection section, wherein:
the number of candidate resources allowed to be selected in the selection section decreases when the number of transmission times of the response signal increase.

2. The radio communication apparatus according to claim 1, wherein:
upon a first transmission of the response signal, the number of candidate resources allowed to be selected in the selection section is the same as the total number of control channel elements, which are allowed to be used in a control channel for reporting a resource allocation result of downlink data; and
upon a second or subsequent transmission of the response signal, the number of candidate resources allowed to be selected in the selection section is less than the total number.

3. The radio communication apparatus according to claim 1, wherein:
upon a first transmission of the response signal, the candidate resources allowed to be selected in the selection section are associated with all control channel element numbers that are allowed to be used in a control channel for reporting a resource allocation result of downlink data; and
upon a second or subsequent transmission of the response signal, the candidate resources allowed to be selected in the selection section are associated with part of control channel element numbers among all the control channel element numbers.

4. The radio communication apparatus according to claim 3, wherein, upon the second or subsequent transmission of the response signal, the candidate resources allowed to be selected in the selection section are associated with the part of control channel element numbers in a regular interval between each other.

5. The radio communication apparatus according to claim 3, wherein, upon the second or subsequent transmission of the response signal, the candidate resources allowed to be selected in the selection section are associated with the part of control channel element numbers, which are a first half or a second half of all the control channel element numbers.

6. The radio communication apparatus according to claim 1, wherein the plurality of resources are divided into a plurality of selected ranges according to the number of times the response signal is transmitted, and the selected ranges corresponding to the number of candidate resources become smaller when the number of times the response signal is transmitted increases.

7. The radio communication apparatus according to claim 1, wherein a cyclic shift interval between the candidate resources allowed to be selected in the selection section becomes longer when the number of times the response signal is transmitted increases.

8. The radio communication apparatus according to claim 1, wherein, upon a first transmission of the response signal, the number of candidate resources allowed to be selected in the selection section is set according to a coding rate in a control channel for reporting a resource allocation result of downlink data.

9. The radio communication apparatus according to claim 1, wherein, upon each transmission of the response signal, the number of candidate resources allowed to be selected in the selection section is set according to the number of control channel elements occupied by a control channel for reporting a resource allocation result of downlink data.

10. A response signal spreading method comprising:
selecting a resource from candidate resources among a plurality of resources based on a signal from another radio communication apparatus, wherein the plurality of resources are defined by a plurality of first sequences and a plurality of second sequences, wherein each first sequence of the plurality of first sequences has a different cyclic shift value from other first sequences, and each second sequence of the plurality of second sequences is orthogonal to each other second sequences;

performing a first spreading of a response signal using a first sequence having a cyclic shift value associated with the selected resource; and performing a second spreading of the response signal after the first spreading using a second sequence associated with the selected resource, wherein the number of candidate resources allowed to be selected in the selection step decreases when the number of transmission times of the response signal increase.

11. A radio communication apparatus comprising:

a transmission section that transmits a signal to another radio communication apparatus; and a reception section that receives a response signal, which is spread and transmitted from the other radio communication apparatus, wherein:

the response signal is spread using a first sequence having a cyclic shift value and a second sequence, which are associated with a resource that is selected from candidate resources among a plurality of resources based on the signal in the other radio communication apparatus, the plurality of resources are defined by a plurality of first sequences and a plurality of second sequences, each first sequence of the plurality of first sequences has different cyclic shift value from other first sequences, and each second sequence of the plurality of second sequences is orthogonal to other second sequences; and the number of candidate resources allowed to be selected in the selection section decreases when the number of transmission times of the response signal increase.

\* \* \* \* \*

UNITED STATES PATENT AND TRADEMARK OFFICE
CERTIFICATE OF CORRECTION

PATENT NO. : 8,422,532 B2  
APPLICATION NO. : 12/679440  
DATED : April 16, 2013  
INVENTOR(S) : Nakao et al.

Page 1 of 2

It is certified that error appears in the above-identified patent and that said Letters Patent is hereby corrected as shown below:

On the Title Page

Item [56] Other Publications, page 2, column 2, lines 3-4 delete:

"NACK Signal in E-UTRA Uplink," May 11, 2007, pp. 1-3, p. 6, line 14."

and insert:

--NACK Signal in E-UTRA Uplink," May 11, 2007, pp. 1-3.--.

Item [56] Other Publications, page 2, column 2, line 7 delete:

"NACKs form different UEs," May 11, 2007, pp. 1-4, p. 6, line 18."

and insert:

--NACKs form different UEs," May 11, 2007, pp. 1-4.--.

Item [56] Other Publications, page 2, column 2, lines 9-10 delete:

"ACK Repetition for E-UTRA Uplink," Aug. 24, 2007, pp. 1-2, p. 6, line 22."

and insert:

--ACK Repetition for E-UTRA Uplink," Aug. 24, 2007, pp. 1-2.--.

Signed and Sealed this  
Twenty-ninth Day of April, 2014

Michelle K. Lee  
*Deputy Director of the United States Patent and Trademark Office*

CERTIFICATE OF CORRECTION (continued)
U.S. Pat. No. 8,422,532 B2

In the Claims

Claim 1, column 19, line 56 delete:

"response signal using a first sequence of having a cyclic"

and insert:

--response signal using a first sequence having a cyclic--.

Claim 10, column 21, line 2 delete:

"orthogonal to each other second sequences;"

and insert:

--orthogonal to other second sequences;--.